United States Patent
Cai et al.

(10) Patent No.: US 11,432,125 B2
(45) Date of Patent: Aug. 30, 2022

(54) RANDOM ACCESS PROCEDURES FOR MTC DEVICES

(71) Applicant: Nokia Solutions and Networks Oy, Espoo (FI)

(72) Inventors: Yigang Cai, Naperville, IL (US); Huy Thang Pham, Dollard-des-Ormeaux (CA)

(73) Assignee: Nokia Solutions and Networks Oy, Espoo (FI)

( * ) Notice: Subject to any disclaimer, the term of this patent is extended or adjusted under 35 U.S.C. 154(b) by 298 days.

(21) Appl. No.: 16/609,864

(22) PCT Filed: May 3, 2017

(86) PCT No.: PCT/US2017/030910
§ 371 (c)(1),
(2) Date: Oct. 31, 2019

(87) PCT Pub. No.: WO2018/203899
PCT Pub. Date: Nov. 8, 2018

(65) Prior Publication Data
US 2020/0077245 A1    Mar. 5, 2020

(51) Int. Cl.
*H04W 4/70* (2018.01)
*H04L 5/00* (2006.01)
(Continued)

(52) U.S. Cl.
CPC ............ *H04W 4/70* (2018.02); *H04L 5/0082* (2013.01); *H04W 28/26* (2013.01); *H04W 74/0833* (2013.01)

(58) Field of Classification Search
CPC ..... H04W 16/00; H04W 28/16; H04W 56/00; H04W 60/00; H04W 74/00; H04W 76/00;
(Continued)

(56) References Cited

U.S. PATENT DOCUMENTS

2009/0316638 A1 * 12/2009 Yi .................. H04W 24/08
370/329
2011/0235558 A1    9/2011 Diachina et al.
(Continued)

FOREIGN PATENT DOCUMENTS

KR    2016 0122666 A    10/2016

OTHER PUBLICATIONS

Kennedy Edemacu et al., "Resource Sharing Between M2M and H2H Traffic under Time-controlled Scheduling Scheme in LTE Networks," 2014 8th International Conference on Telecommunication Systems Services and Applications (TSSA), 6 pages, 2014.
(Continued)

*Primary Examiner* — Nishant Divecha
(74) *Attorney, Agent, or Firm* — Fay Sharpe LLP

(57) ABSTRACT

Systems, methods, and software for handling random access procedures. In one embodiment, an access network element that stores an MTC reservation pattern that defines at least one MTC-On interval where MTC is allowed, and defines at least one MTC-Off interval where MTC is prohibited. During an MTC-On interval, the access network element receives preambles for random access procedures from MTC devices, and performs the random access procedures for the MTC devices in response to the preambles. The access network element detects a transition from the MTC-On interval to a next MTC-Off interval, and determines whether the random access procedures for the MTC devices will complete before the transition. If not, the access network element modifies the MTC reservation pattern to expedite completion of the random access procedures.

18 Claims, 20 Drawing Sheets

(51) Int. Cl.
*H04W 28/26* (2009.01)
*H04W 74/08* (2009.01)

(58) Field of Classification Search
CPC ... H04W 4/70; H04W 28/26; H04W 74/0833; H04L 5/0082
See application file for complete search history.

(56) References Cited

U.S. PATENT DOCUMENTS

| | | | | |
|---|---|---|---|---|
| 2012/0099543 | A1* | 4/2012 | Yang | H04W 74/006 370/329 |
| 2014/0050170 | A1* | 2/2014 | Xu | H04W 76/27 370/329 |
| 2015/0029921 | A1* | 1/2015 | Lu | H04W 52/0216 370/311 |

OTHER PUBLICATIONS

International Search Report for PCT/US2017/030910 dated Jan. 25, 2018.

* cited by examiner

FIG. 9

| | FRAME0 | | | | | | | | | | FRAME1 | | | | | | | | | | FRAME2 | | | | | | | | | | FRAME3 | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| MPDCCH | | U | U | U | D | D | D | D | D | | | | | | D | D | D | D | D | | | U | U | U | D | D | D | D | D | | | | | | D | D | D | D | D | | |
| PDSCH | | | | | | | | | | | | | | | | | | | | | | | | | | | | | | | | | | | | | | | | |
| PUSCH | | | | | | | | | U | U | U | U | U | U | U | U | U | | | | | | | | | | | U | U | U | U | U | U | U | U | U | U | | | |

FIG. 10

| | FRAME0 | | | | | | | | | | FRAME1 | | | | | | | | | | FRAME2 | | | | | | | | | | FRAME3 | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| MPDCCH | | U | U | U | | | | | | | | | | | | | | | | | | U | U | U | | | | | | | | | | | | | | | | |
| PDSCH | | | | | | | | | | | | | | | | | | | | | | | | | | | | | | | | | | | | | | | | |
| PUSCH | | | | | | | | U | U | U | U | U | U | U | U | U | U | U | | | | | | | | | | U | U | U | U | U | U | U | U | U | U | U | | |

FIG. 11

| | FRAME0 | | | | | | | | | | FRAME1 | | | | | | | | | | FRAME2 | | | | | | | | | | FRAME3 | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| MPDCCH | | | | | D | D | D | | | | | | | | | | | D | | | | | | | D | D | D | | | | | | | | | | | D | | |
| PDSCH | | | | | | | | | | | | D | D | D | D | D | | | | | | | | | | | | | | | | D | D | D | D | D | | | | |
| PUSCH | | | | | | | | | | | | | | | | | | | | | | | | | | | | | | | | | | | | | | | | |

RANDOM ACCESS PROCEDURES FOR MTC DEVICES

FIELD OF THE INVENTION

The invention is related to the field of communication systems and, in particular, to random access procedures in an access network.

BACKGROUND

Machine Type Communications (MTC) or Machine-to-Machine (M2M) communications refer to technologies that allow devices to communicate with no or little human intervention. MTC devices store data, and transmit the data to other MTC devices or an MTC server over a network, such as a cellular network. For example, an MTC device may be attached to a gas or electric meter, and the MTC device periodically (e.g., weekly, monthly, etc.) transmits a meter reading to an MTC server, such as at the utility company.

The amount of data exchanged between MTC devices is typically very small, such as less than a few bytes. Because MTC devices send or receive only small amounts of data, the exchanges of data are considered "small data transmissions". The amount that is considered "small" may depend on individual network operators.

MTC continues to increase over core networks. Thus, efficient use of network resources for MTC, especially radio resources, is important to network operators.

SUMMARY

Embodiments described herein provide management of random access procedures when the air interface of an access network is shared between MTC transmissions and non-MTC transmissions. An MTC reservation pattern is defined for the air interface, which includes one or more MTC-On intervals wherein MTC transmissions are allowed, and one or more MTC-Off intervals where MTC transmissions are prohibited. If random access procedures for MTC devices are not able to complete during an MTC-On interval, then the MTC reservation pattern is modified as described in the following embodiments so that the random access procedures are allowed to complete without undue delay. If random access procedures for MTC devices are postponed during an MTC-Off interval, then the MTC reservation pattern may be modified as described in the following embodiments so that the random access procedures are also allowed to complete without undue delay.

One embodiment comprises an access network element of an access network that is configured to communicate with a plurality of devices over an air interface. The access network element includes a pattern database configured to store a Machine-Type Communications (MTC) reservation pattern that defines at least one MTC-On interval where MTC is allowed, and defines at least one MTC-Off interval where MTC is prohibited. The access network element also includes a scheduling mechanism configured to identify the MTC reservation pattern from the pattern database. During an MTC-On interval of the MTC reservation pattern, the scheduling mechanism is configured to receive preambles for random access procedures from MTC devices, and to perform the random access procedures for the MTC devices in response to the preambles. The scheduling mechanism is configured to detect a transition from the MTC-On interval to a next MTC-Off interval in the MTC reservation pattern, and to determine whether the random access procedures for the MTC devices will complete before the transition. The scheduling mechanism, responsive to a determination that the random access procedures for the MTC devices will not complete before the transition, is configured to initiate modification of the MTC reservation pattern.

In another embodiment, modification of the MTC reservation pattern includes extending the MTC-On interval into the next MTC-Off interval until the random access procedures for each of the MTC devices are complete.

In another embodiment, modification of the MTC reservation pattern includes truncating the next MTC-Off interval, and reallocating a truncated portion of the next MTC-Off interval as another MTC-On interval.

In another embodiment, the access network element further comprises a pattern manager. The scheduling mechanism is configured to determine a time difference between receipt of a preamble for a random access procedure and the transition from the MTC-On interval to the next MTC-Off interval, to send a first message to the pattern manager requesting extension of the MTC-On interval when the time difference is greater than a threshold, and to receive a first modified MTC reservation pattern from the pattern manager where the MTC-On interval is extended into the next MTC-Off interval.

In another embodiment, the scheduling mechanism is configured to send a second message to the pattern manager requesting truncation of the next MTC-Off interval when the time difference is less than the threshold, and to receive a second modified MTC reservation pattern from the pattern manager where a truncated portion of the next MTC-Off interval is reallocated as another MTC-On interval.

In another embodiment, during an MTC-Off interval of the MTC reservation pattern, the scheduling mechanism is configured to receive preambles for random access procedures from the MTC devices, and to postpone the random access procedures for the MTC devices.

In another embodiment, the scheduling mechanism is configured to determine a time difference between receipt of a preamble for a random access procedure and the transition from the MTC-Off interval to a next MTC-On interval, to send a message to the pattern manager requesting truncation of the MTC-Off interval when the time difference is greater than a threshold, and to receive a modified MTC reservation pattern from the pattern manager where a truncated portion of the MTC-Off interval is reallocated as another MTC-On interval. The scheduling mechanism is configured to allow the MTC-Off interval to expire without modifying the MTC reservation pattern when the time difference is less than the threshold.

Another embodiment comprises a method of handling random access procedures over an air interface of an access network. The method includes storing an MTC reservation pattern that defines at least one MTC-On interval where MTC is allowed, and defines at least one MTC-Off interval where MTC is prohibited. The method includes identifying the MTC reservation pattern from the pattern database. During an MTC-On interval of the MTC reservation pattern, the method includes receiving preambles for the random access procedures from MTC devices, performing the random access procedures for the MTC devices in response to the preambles, detecting a transition from the MTC-On interval to a next MTC-Off interval in the MTC reservation pattern, determining whether the random access procedures for the MTC devices will complete before the transition, and modifying the MTC reservation pattern responsive to a determination that the random access procedures for the MTC devices will not complete before the transition.

In another embodiment, modifying the MTC reservation pattern comprises extending the MTC-On interval into the next MTC-Off interval until the random access procedures for each of the MTC devices are complete.

In another embodiment, modifying the MTC reservation pattern comprises truncating the next MTC-Off interval, and reallocating a truncated portion of the next MTC-Off interval as another MTC-On interval.

In another embodiment, modifying the MTC reservation pattern comprises determining a time difference between receipt of a preamble for a random access procedure and the transition from the MTC-On interval to the next MTC-Off interval, sending a first message from the scheduling mechanism to a pattern manager requesting extension of the MTC-On interval when the time difference is greater than a threshold, and receiving a first modified MTC reservation pattern from the pattern manager where the MTC-On interval is extended into the next MTC-Off interval.

In another embodiment, the method further comprises sending a second message from the scheduling mechanism to the pattern manager requesting truncation of the next MTC-Off interval when the time difference is less than the threshold, and receiving a second modified MTC reservation pattern from the pattern manager where a truncated portion of the next MTC-Off interval is reallocated as another MTC-On interval.

In another embodiment, during an MTC-Off interval of the MTC reservation pattern, the method comprises receiving preambles for random access procedures from the MTC devices, and postponing the random access procedures for the MTC devices.

In another embodiment, the method further comprises determining a time difference between receipt of a preamble for a random access procedure and the transition from the MTC-Off interval to a next MTC-On interval. When the time difference is greater than a threshold, the method includes sending a message from the scheduling mechanism to the pattern manager requesting truncation of the MTC-Off interval, and receiving a modified MTC reservation pattern from the pattern manager where a truncated portion of the MTC-Off interval is reallocated as another MTC-On interval. When the time difference is less than the threshold, the method includes allowing the MTC-Off interval to expire without modifying the MTC reservation pattern.

Another embodiment comprises a non-transitory computer readable medium embodying programmed instructions executed by a processor. The instructions direct the processor to implement an access network element of an access network that is configured to communicate with a plurality of devices over an air interface. The access network element includes a pattern database configured to store an MTC reservation pattern that defines at least one MTC-On interval where MTC is allowed, and defines at least one MTC-Off interval where MTC is prohibited. The access network element also includes a scheduling mechanism configured to identify the MTC reservation pattern from the pattern database. During an MTC-On interval of the MTC reservation pattern, the scheduling mechanism is configured to receive preambles for random access procedures from MTC devices, and to perform the random access procedures for the MTC devices in response to the preambles. The scheduling mechanism is configured to detect a transition from the MTC-On interval to a next MTC-Off interval in the MTC reservation pattern, and to determine whether the random access procedures for the MTC devices will complete before the transition. The scheduling mechanism, responsive to a determination that the random access procedures for the MTC devices will not complete before the transition, is configured to initiate modification of the MTC reservation pattern.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIGS. 9-11 illustrate sharing patterns in an exemplary embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
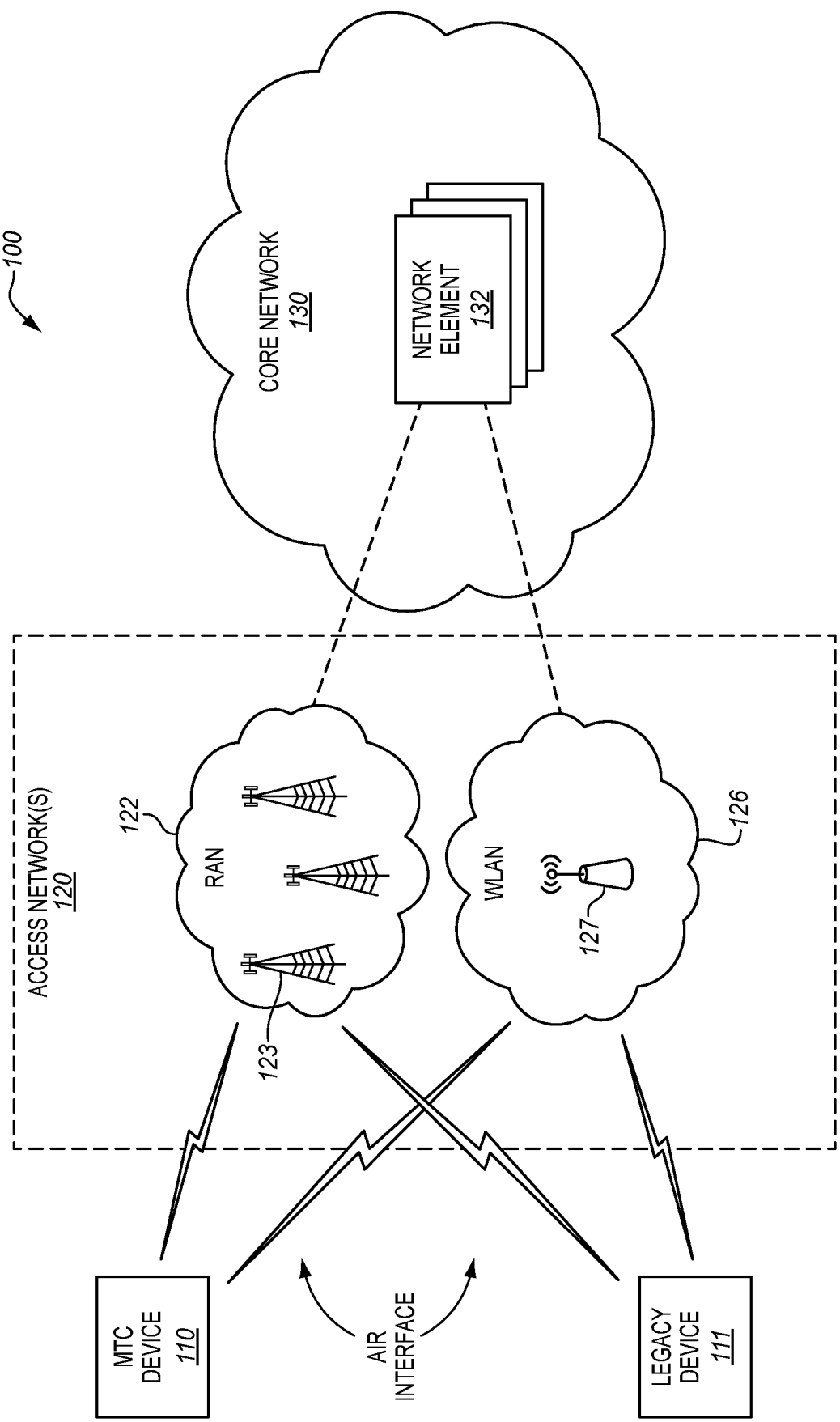
FIG. 1 illustrates a communication network in an exemplary embodiment.

FIG. 1 illustrates a communication network 100 in an exemplary embodiment. Communication network 100 is a cellular network or mobile network where the last link is wireless, and provides voice and/or data services to a plurality of devices. Communication network 100 is a Third Generation (3G), Fourth Generation (4G), or later generation network, such as a Long Term Evolution (LTE) network.

Communication network 100 may provide an Internet of Things (IoT) solution, which refers to interconnection and the autonomous exchange of data between devices that are machines or parts of machines. IoT uses Machine-to-Machine (M2M) communications or Machine-Type Communications (MTC). M2M/MTC is defined as data communication between devices without the human interaction. Examples of M2M/MTC services include utility meters, vending machines, fleet management, smart traffic, real-time traffic information to a vehicle, security monitoring, medical metering and alerting, etc. M2M/MTC services work well with lower data rates than regular cellular services. For example, the Third Generation Partnership Project (3GPP) has defined new categories for LTE in Release 13, which include LTE Cat-M1 (eMTC) and Cat-NB1 (NB-IoT). Cat-M1 (also referred to as LTE Cat 1.4 MHz) has a peak rate of 1 Mbps for uplink (UL) and downlink (DL), and a bandwidth of 1.4 MHz. Cat-NB1 (also referred to as LTE Cat 200 kHz) has a peak rate of 200 kbps for DL, peak rate of 144 Mbps for UL, and a bandwidth of 200 kHz. MTC-enabled devices may operate according to one of these categories for MTC within communication network 100.

Communication network 100 also provides regular high-speed wireless communications for devices and data terminals. For example, the LTE standard set forth by the 3GPP defines Cat-4. Cat-4 (in Release 8) has a peak rate of 150 Mbps for DL, a peak rate of 50 Mbps for UL, and a bandwidth of 20 MHz. These "regular" communications/transmissions in communication network 100 are referred to herein as "legacy" transmissions. Legacy transmissions are defined as non-MTC transmissions, such as voice calls, streaming video, streaming audio, or other higher-speed communications. Non-MTC devices may perform legacy transmissions (e.g., Cat-4) for non-MTC within communication network 100.

Communication network 100 is illustrated as providing communication services to devices 110-111 (along with other devices not shown) located within the same cell. Device 110 is enabled for M2M/MTC services, and is referred to as MTC device 110. MTC device 110 is configured to send and receive various types of transmissions, which may be referred to herein as MTC traffic or MTC transmissions. For example, MTC transmissions may include small data transmissions, such as sensor readings, temperature readings, control signals, etc. Device 111 is enabled for regular voice and/or data services, and is referred to as legacy device 111. Legacy device 111 may include any wireless device not classified as an MTC-enabled device. For example, legacy device 111 may include end user devices such as laptop computers, tablets, smartphones, etc. Legacy device 111 is configured to send and receive various types of transmissions, which may be referred to herein as legacy traffic or legacy transmissions. For example, legacy transmissions may include voice calls, audio, video, multimedia, data, etc.

Communication network 100 includes one or more wireless access networks 120 that communicate with devices 110-111 over radio signals. One of the access networks 120 may be a Radio Access Network (RAN) 122 that includes one or more base stations 123. Base station 123 comprises an entity that uses radio communication technology to communicate with a device on the licensed spectrum, and interface the device with a core network. One example of RAN 122 is an Evolved-UMTS Terrestrial Radio Access Network (E-UTRAN) having one or more Evolved-NodeBs (eNodeB), which are base stations of the E-UTRAN.

Another one of the access networks 120 may be a Wireless Local Area Network (WLAN) 126 that includes one or more Wireless Access Points (WAP) 127. WLAN 126 is a network in which a device is able to connect to a Local Area Network (LAN) through a wireless (radio) connection. WAP 127 is a node that uses radio communication technology to communicate with a device over the unlicensed spectrum, and provides the device access to a core network. One example of WAP 127 is a WiFi access point that operates on the 2.4 GHz or 5 GHz radio bands.

Devices 110-111 are able to attach to RAN 122 and/or WLAN 126 to access a core network 130. In other words, access networks 120 represent the air interface between devices 110-111 and core network 130. Core network 130 is the central part of communication network 100 that provides various services to customers who are connected by one (or more) of access networks 120. One example of core network 130 is the Evolved Packet Core (EPC) network as suggested by the 3GPP for LTE. Core network 130 includes one or more network elements 132, which comprise a server, device, apparatus, or equipment (including hardware) that provides services for devices 110-111. Network elements 132, particularly in an EPC network, may comprise a Mobility Management Entity (MME), a Serving Gateway (S-GW), a Packet Data Network Gateway (P-GW), etc. Within an EPC network, the user data (also referred to as the "user plane") and the signaling (also referred to as the "control plane") are separated. The MME handles the control plane within the EPC network. For instance, the MME handles the signaling related to mobility and security for E-UTRAN access. The MME is responsible for tracking and paging mobile devices in idle-mode. The S-GW and P-GW handle the user plane. The S-GW and P-GW transport IP data traffic between devices 110-111 and the external IP networks. The S-GW is the point of interconnect between the radio-side and the EPC network, and serves a device 110-111 by routing incoming and outgoing IP packets. The S-GW is also the anchor point for the intra-LTE mobility (i.e., in case of handover between eNodeBs), and between LTE and other 3GPP accesses. The P-GW is the point of interconnect between the EPC network and external IP networks, and routes packets to and from the external IP networks.

IoT services as provided by communication network 100 are projected to be a driver for further growth in cellular, as billions of these devices will be deployed in the future. Thus, many MTC devices will be competing for radio resources of the air interface. For LTE-based services, the basic premise is that MTC devices will use specific radio resources of the air interface per 3GPP standards. However, allocation of an entire radio channel for each MTC device (or even a logical group of devices) can be expensive. Radio channel demands for MTC services are very low and tend to be sporadic due to the goal of conserving battery power on MTC devices. Thus, a dedicated radio bearer, even of a low capacity (e.g., 200 Mbps), would remain expensive for a service provider.

Because the usage profile of MTC devices is sporadic and involves small data transmissions, it may be beneficial to share the uplink (UL) and downlink (DL) channels between MTC transmissions and regular, legacy transmissions (e.g., LTE data traffic and VoLTE traffic). Thus, an access network 120 can perform radio resource allocation in a number of ways to share the radio resources of the air interface between MTC transmissions and legacy transmissions.

Figure 2:
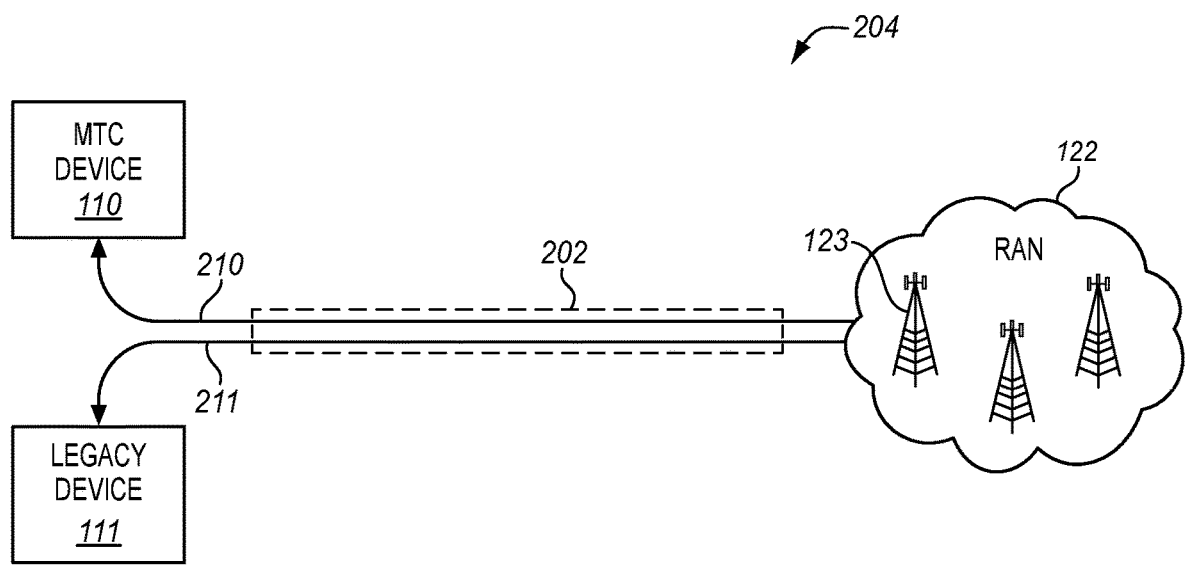
FIG. 2 illustrates radio resource sharing in an exemplary embodiment.

FIG. 2 illustrates radio resource sharing in an exemplary embodiment. FIG. 2 illustrates DL data transmissions from base station 123 to MTC device 110 and legacy device 111. In this embodiment, base station 123 provides a coverage area referred to as a cell, and has established one or more radio channels 202 with MTC device 110 and legacy device 111 that are located in the cell. The radio channels 202 are physical connections of the air interface 204 that are radio-based. Base station 123 also determines a scheduling of radio resources on radio channels 202 so that the radio resources are shared between MTC device 110 and legacy device 111. Based on the scheduling, base station 123 may send a transmission 210 over one or more of the radio channels 202 to MTC device 110 concurrently with sending a transmission 211 over one or more of radio channels 202 to legacy device 111. The transmissions 210-211 may share the radio resources of radio channels 202, such as a frame in the time domain, and the system bandwidth in the frequency domain, for an LTE air interface.

Figure 3:
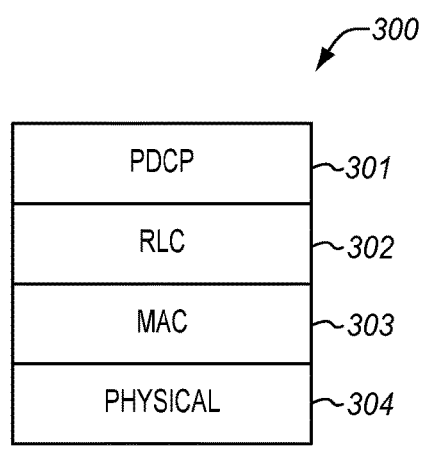
FIG. 3 illustrates the LTE protocol stack.

To understand radio resource sharing, FIGS. 3-6 illustrate the LTE air interface as an example. FIG. 3 illustrates the LTE protocol stack 300. For the user plane and the control plane, LTE protocol stack 300 includes the Packet Data Convergence Protocol (PDCP) layer 301, the Radio Link Control (RLC) layer 302, the Medium Access Control (MAC) layer 303, and the physical layer 304. The control plane will additionally include the Radio Resource Control (RRC) layer (not shown in FIG. 3), which configures the lower layers 301-304. Physical layer 304 offers data transport services between an eNodeB and User Equipment (UE) to the higher layers 301-303. Data and signaling messages are carried on physical channels between the different levels of physical layer 304. The physical channels are divided into physical data channels and physical control channels. The physical data channels include the Physical Downlink Shared Channel (PDSCH), the Physical Broadcast Channel (PBCH), the Physical Multicast Channel (PMCH), the Physical Uplink Shared Channel (PUSCH), and the Physical Random Access Channel (PRACH). The physical control channels include the Physical Control Format Indicator Channel (PCFICH), the Physical Hybrid ARQ Indicator Channel (PHICH), the Physical Downlink Control Channel (PDCCH), and the Physical Uplink Control Channel (PUCCH). For MTC, the physical control channels also include an MTC Physical Downlink Control Channel (MPDCCH), which is a special type of PDCCH designed for bandwidth-reduced operation.

Figure 4:
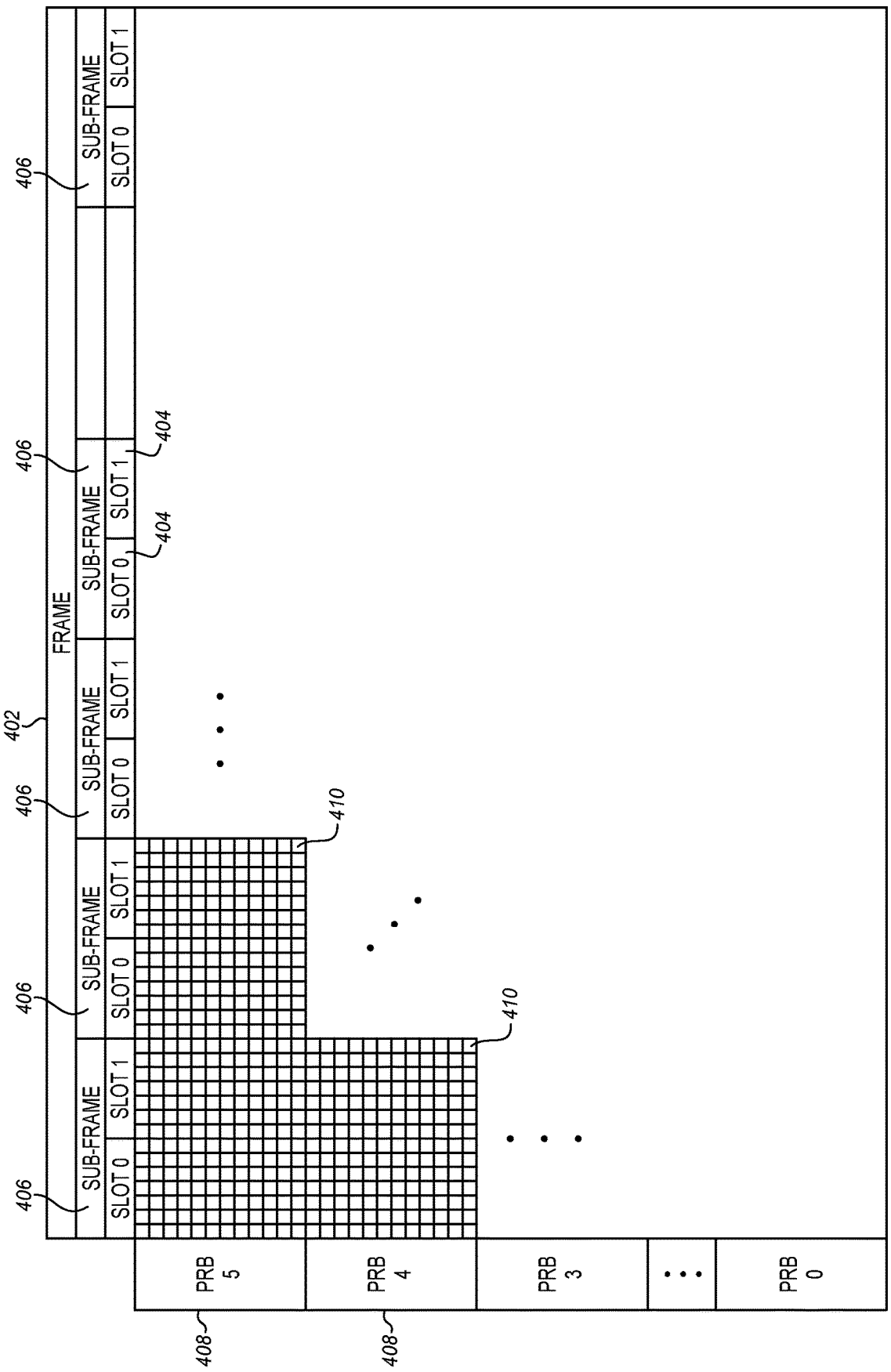
FIG. 4 illustrates a DL LTE frame structure for the LTE air interface.

LTE presently uses Orthogonal Frequency Division Multiplexing (OFDM) for the DL physical channels to transmit data in parallel over many closely-spaced sub-carriers using frames, and uses Single Carrier Frequency Division Multiple Access (SC-FDMA) for UL physical channels. FIG. 4 illustrates a DL LTE frame structure for the LTE air interface. A frame 402 has an overall length of 10 milliseconds (ms). Frame 402 is divided into twenty individual slots 404 (0.5 ms), and a sub-frame 406 is comprised of two slots 404. Thus, there are ten sub-frames 406 (1 ms) within each frame 402. Each Transmission Time Interval (TTI) consists of two slots 404 or one sub-frame 406 (1 ms). For a normal cyclic prefix, there are seven OFDM symbols per slot 404. The OFDM symbols are grouped into Physical Resource Blocks (PRB) 408 that are made up of Resource Elements (RE) 410. REs 410 are the smallest modulation structure in LTE. Each RE 410 is one subcarrier (e.g., 15 kHz) by one OFDM symbol.

Figure 5:
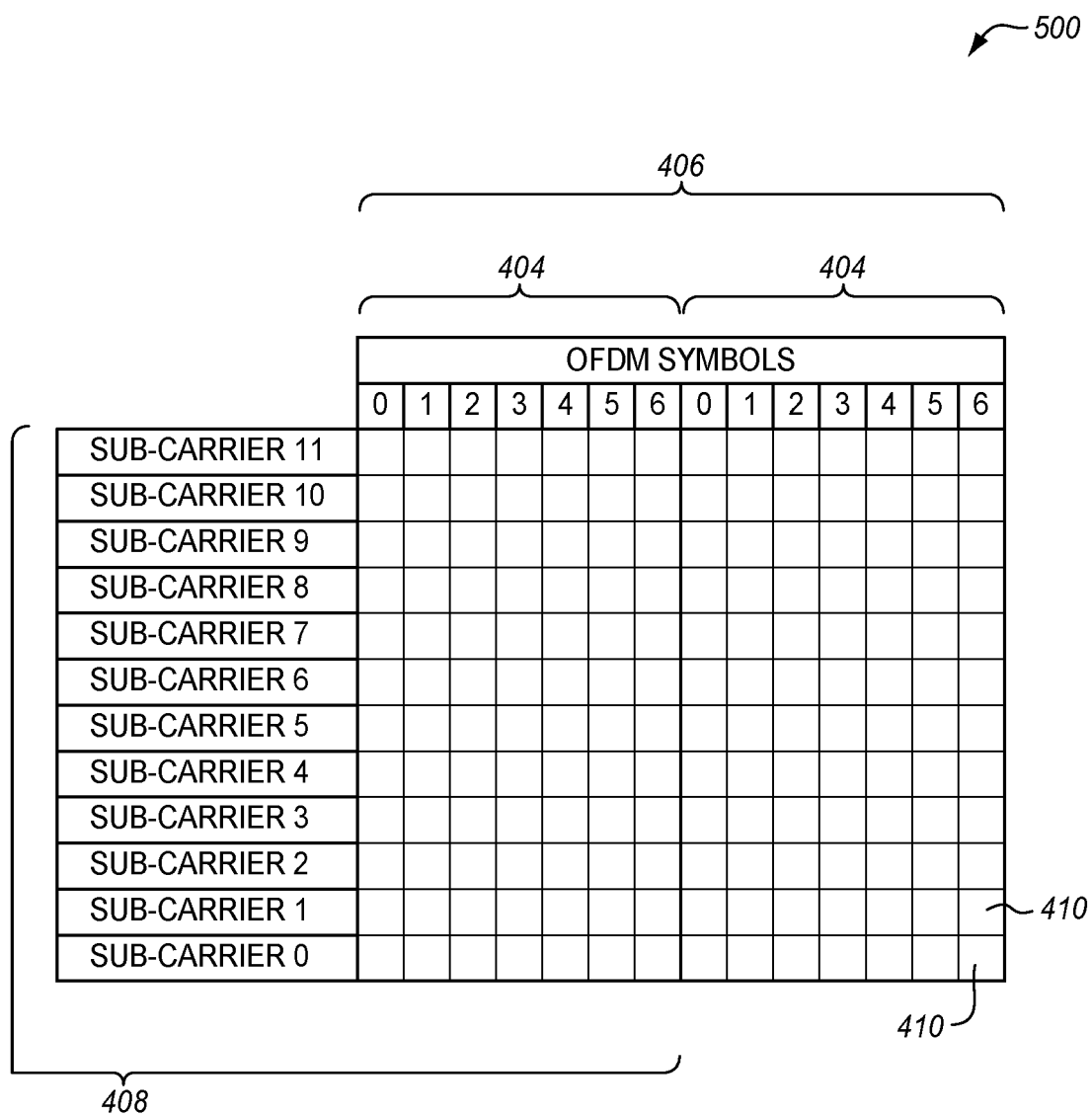
FIG. 5 illustrates Physical Resource Blocks (PRBs) in a time/frequency grid.

FIG. 5 illustrates PRBs 408 in a time/frequency grid 500. The time domain is shown horizontally, and the frequency domain is shown vertically in the grid 500 of FIG. 5. A PRB 408 includes twelve sub-carriers (180 kHz in total) in the frequency domain, and one slot 404 (0.5 ms) of 7 OFDM symbols in the time domain. Thus, each PRB 408 comprises eighty-four REs 410 (12×7). A PRB 408 is the smallest unit of radio resources allocated to a UE. The more PRBs 408 allocated to a UE, the higher bit-rate is available to the UE. The number of PRBs 408 that are allocated to a UE at a given point in time depends on scheduling mechanisms in the time and frequency domains.

Figure 6:
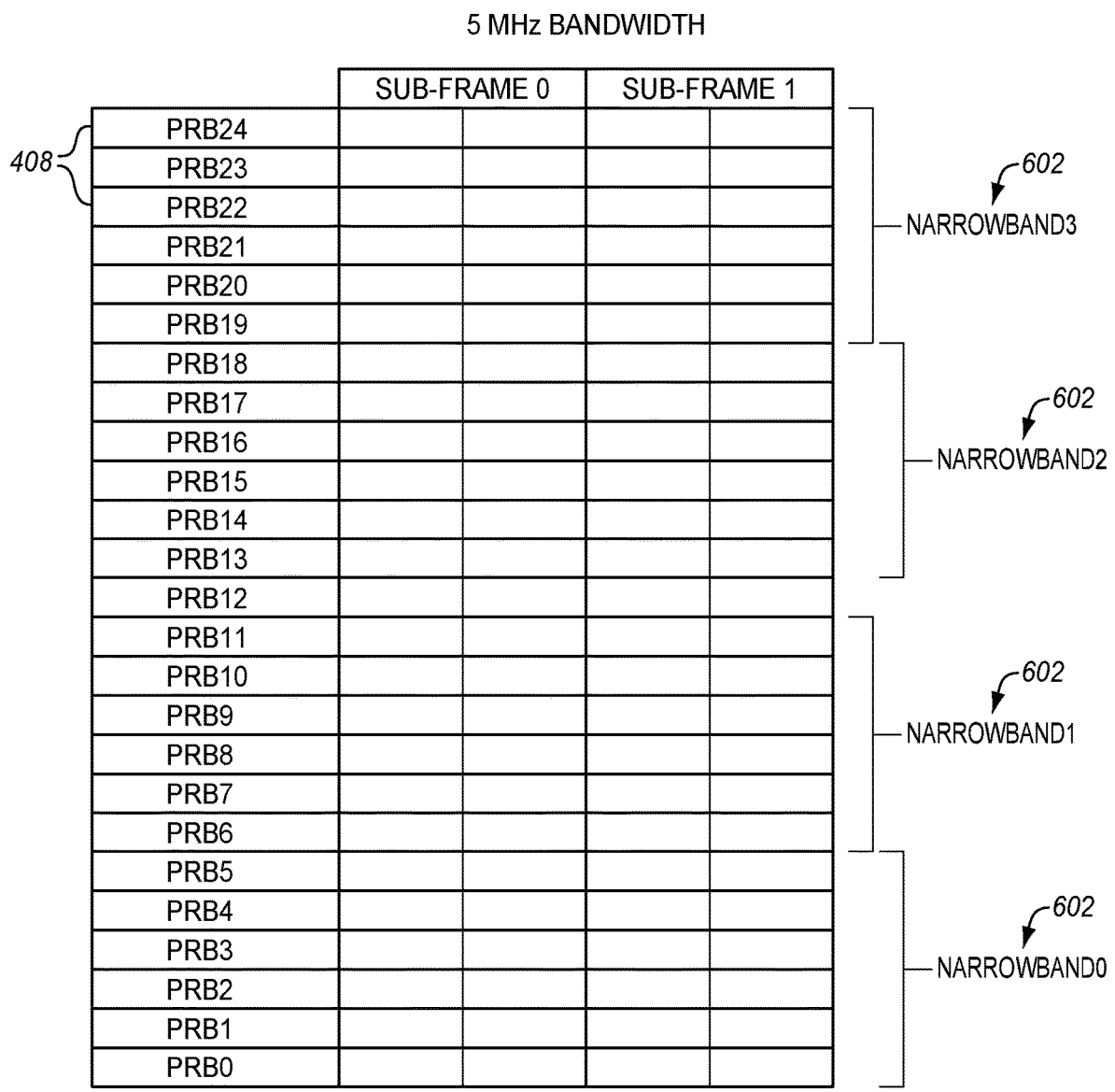
FIG. 6 illustrates a 5 MHz bandwidth in LTE.

FIG. 6 illustrates a 5 MHz bandwidth in LTE. A 5 MHz bandwidth is made up of three hundred subcarriers and twenty five PRBs 408. With a total of twenty five PRBs 408, there are four narrowbands 602 (NB) available (the extra PRB is located at the center of the system bandwidth). A narrowband 602 is defined as a set of six contiguous PRBs 408. Thus, the LTE frame structure illustrated in FIG. 4 is for one narrowband.

The PRBs 408 illustrated in FIGS. 4-5 may be used for the physical data channels (e.g., PDSCH, PBCH, PUSCH, etc.) and the physical control channels (e.g., PDCCH, PUCCH, MPDCCH, etc.) for the LTE air interface. A scheduling mechanism will allocate the PRBs 408 for the physical data channels and the physical control channels at any point in time to send control information to UEs, to send data to the UEs (DL), to receive data from the UEs (UL), etc.

For MTC, two major impacts are enormous amount of devices, and limited data transmission per device. Within an LTE network, introducing Cat-M1 into an LTE network may affect legacy traffic, as Cat-M1 resource allocation competes with legacy LTE resources. A network operator cannot tolerate degradation of legacy performance when Cat-M1 traffic shares the same cell with legacy traffic. Therefore, effective sharing of radio resources in a cell between Cat-M1 traffic and legacy LTE traffic is a concern for network operators. Embodiments described herein provide for an enhanced scheduling mechanism for sharing radio resources between MTC (e.g., Cat-M1 transmissions) and non-MTC (i.e., legacy LTE transmissions) over the air interface, such as an LTE air interface. As a brief overview, radio resource sharing patterns are predefined to balance radio resource usage between MTC and non-MTC. The sharing patterns are optimized for radio resource sharing based on one or more factors, such as legacy traffic load, MTC traffic load, Time-Of-Day (TOD), Day-Of-Week (DOW), cell conditions, etc. Thus, an MTC solution can be implemented in a network without having an unacceptable impact on legacy traffic.

Figure 7:
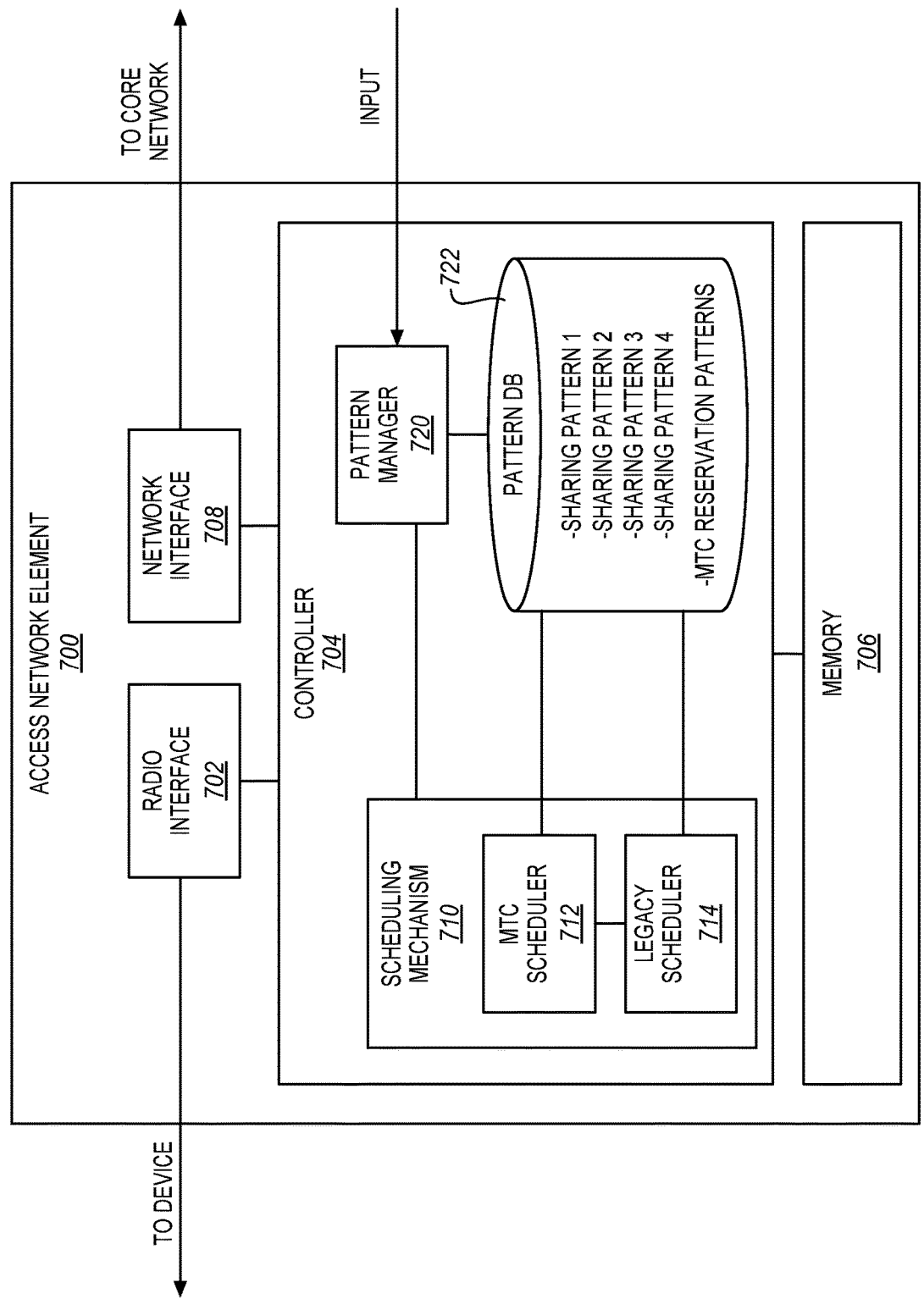
FIG. 7 is a block diagram of an access network element in an exemplary embodiment.

FIG. 7 is a block diagram of an access network element 700 in an exemplary embodiment. Access network element 700 comprises any node or collection of nodes of an access network (e.g., RAN 122 or WLAN 126), such as a base station 123, a WAP 127, a base station and associated controller, etc. Access network element 700 includes a radio interface component 702, a controller 704 (including one or more processors), a memory 706, and a network interface component 708. Radio interface component 702 represents the local radio resources of access network element 700, such as transceivers and antennas, used for wireless communications to exchange over-the-air signals. Controller 704 represents the internal circuitry, logic, hardware (e.g., a processor), software, etc., that provides the functions of access network element 700. Memory 706 is a storage unit for data, instructions, applications, etc., and is accessible by controller 704 or other devices. Network interface component 708 is an interface component that provides an interface or backhaul connection with a core network. The components of access network element 700 may be implemented on the same hardware platform (including one or more processors), or on separate platforms.

Controller 704 implements a scheduling mechanism 710. Scheduling mechanism 710 comprises a device or set of devices that schedules MTC transmission and/or non-MTC transmissions via the radio resources of an air interface, such as an LTE air interface. Scheduling mechanism 710 may schedule only non-MTC transmissions during certain scheduling windows to devices located within a cell. Other times, scheduling mechanism 710 may schedule MTC and non-MTC transmissions, in which case the radio resources are shared between the MTC transmissions and the non-MTC transmissions. The times where both MTC and non-MTC transmissions are scheduled on the air interface are referred to herein as resource sharing windows. Although not shown in FIG. 7, scheduling mechanism 710 may comprise one or more processors, one or more blade servers, one or more Virtual Machines (VM) running on a hardware platform, or other hardware devices.

In one embodiment, scheduling mechanism 710 may include an MTC scheduler 712 and a legacy scheduler 714. MTC scheduler 712 is configured to schedule MTC transmissions (e.g., physical data channels and physical control channels) on the air interface. Legacy scheduler 714 is configured to schedule non-MTC or legacy transmissions (e.g., physical data channels and physical control channels) on the same air interface. MTC scheduler 712 and legacy scheduler 714 may comprise separate physical devices that a connected by an interface (e.g., a proprietary interface). Each of the separate physical devices may comprise one or more processors, one or more blade servers, one or more VMs running on a hardware platform, etc. MTC scheduler 712 and legacy scheduler 714 may alternatively comprise a shared physical device that performs the functions of both the MTC scheduler 712 and legacy scheduler 714.

Controller 704 also includes a pattern manager 720 and a pattern database (DB) 722. Pattern manager 720 is configured to manage one or more sharing patterns. A sharing pattern comprises a mapping of radio resources between MTC and non-MTC on the physical layer of an air interface. One assumption is that a multiple access modulation format (e.g., OFDM, Non-Orthogonal Multiple Access (NOMA), etc.) is used on the physical layer of the air interface that segments the physical layer into radio resources in the time domain and in the frequency domain. The radio resources may comprise PRBs, which have both a time and a frequency dimension. The radio resources may comprise sub-frames in the time domain, and narrowbands or subcarriers in the frequency domain. A sharing pattern therefore maps some radio resources to MTC and other radio resources to non-MTC. For example, a sharing pattern may map or allocate a first set of sub-frames to MTC only, and a second set of sub-frames to non-MTC only on one or more narrowbands. The sharing patterns may be predefined by pattern manager 720, by a network operator, etc., based on factors to maximize the use of the radio resources without unacceptably impacting non-MTC transmissions on the air interface. Pattern database 722 is configured to store the predefined sharing patterns (e.g., sharing patterns 1-4). Each sharing pattern may be assigned a unique identifier (ID) that is stored in pattern database 722.

The sharing patterns allocate radio resources for MTC and non-MTC in the time and frequency domains within a resource sharing window (e.g., a variable time period or number of TTIs). One or more sharing patterns may fit in a resource sharing window depending on the length of the resource sharing window. The sharing patterns may be designed as bandwidth independent. The sharing patterns may allocate radio resources for DL, UL, or both for control channels and data channels. The sharing patterns may also include selection criteria for selecting among a plurality of sharing patterns for a resource sharing window. The selection criteria comprise any characteristics, constraints, rules, etc., for selecting a sharing pattern. The selection criteria may include operator-defined weight factors, which allow the operator to increase or decrease MTC or non-MTC for different resource sharing windows. The selection criteria may include radio coverage conditions for MTC devices within a cell (e.g., center, edge, CAT-M1 capability, etc.). The selection criteria may include MTC traffic load and/or non-MTC traffic load in an access network. The selection criteria may include TOD, DOW, peak, off-peak, etc. The selection criteria may include MTC or non-MTC prioritization input from a network operator, DL/UL Hybrid Automatic Repeat Request (HARQ) retransmission requirements, Modulation Coding Scheme (MCS) correction requirements, S1 and paging transmissions, etc. The selection criteria may include cell conditions, such as coverage, SINR, whether a device is located in urban areas, remote areas, etc. The selection criteria may include considerations for mobility, eMBMS, VoLTE traffic, etc. The selection criteria may include considerations for power saving requirements for devices.

Figure 8:
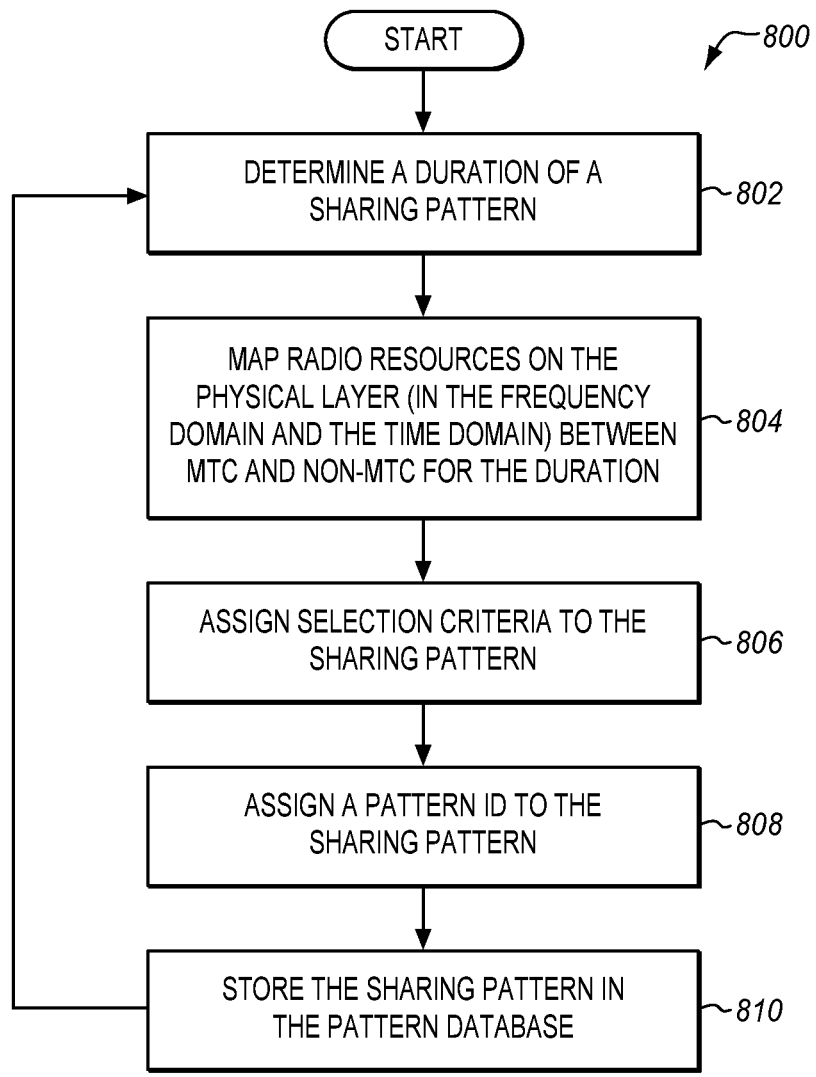
FIG. 8 is a flow chart illustrating a method of generating sharing patterns in an exemplary embodiment.

FIG. 8 is a flow chart illustrating a method 800 of generating sharing patterns in an exemplary embodiment. The steps of method 800 will be described with reference to access network element 700 in FIG. 7, but those skilled in the art will appreciate that method 800 may be performed in other networks or architectures. Also, the steps of the flow charts described herein are not all inclusive and may include other steps not shown, and the steps may be performed in an alternative order.

To generate a sharing pattern, pattern manager 720 determines a duration of the sharing pattern (step 802). For example, the duration of a sharing pattern may be 20 ms (20 sub-frames), 40 ms, etc. The duration of a sharing pattern is configurable as desired. Pattern manager 720 maps radio resources on the physical layer of the air interface in the frequency domain and the time domain between MTC and non-MTC for the duration based on an algorithm (step 804).

The algorithm may take multiple restraints or conditions into account in determining an optimal mapping. To map the radio resources, pattern manager 720 allocates some radio resources to MTC only, and allocates other radio resources for non-MTC only. For example, pattern manager 720 may identify sub-frames for the duration of the sharing pattern, and allocate some sub-frames to MTC and other sub-frames to non-MTC. Pattern manager 720 may allocate the sub-frames for one or more narrowbands (and/or subcarriers) in the frequency domain. Pattern manager 720 may map radio resources to UL or DL for control channels and data channels.

A network operator may provide input to pattern manager 720 to indicate the restraints or conditions that are taken into account in determining an optimal mapping. For example, the network operator may provide the condition of heavy MTC traffic load in an access network (or cell of the access network) to pattern manager 720. In response to this condition, pattern manager 720 may map radio resources between MTC and non-MTC to optimize performance for heavy MTC traffic load. The network operator may provide the condition of light MTC traffic load to pattern manager 720. In response to this condition, pattern manager 720 may map radio resources between MTC and non-MTC to optimize performance for light MTC traffic load.

Pattern manager 720 assigns selection criteria to the sharing pattern (step 806) for selecting this sharing pattern among multiple sharing patterns. For example, the selection criteria may include an operator-defined weight factor, which indicates how much a network operator favors this sharing pattern. The selection criteria may include an MTC traffic load, such as a threshold, that triggers selection of this sharing pattern. The selection criteria may include a non-MTC traffic load, such as a threshold, that triggers selection of this sharing pattern. Pattern manager 720 also assigns a pattern ID to the sharing pattern (step 808), and stores the sharing pattern in pattern database 722 (step 810).

Pattern manager 720 repeats steps 802-810 to generate multiple sharing patterns that have different mappings for the radio resources between MTC and non-MTC. The sharing patterns may each be optimized for different conditions within an access network. For example, a first sharing pattern may be optimized for a heavy MTC traffic load in the access network, while a second sharing pattern may be optimized for a heavy non-MTC traffic load. A third sharing pattern may be optimized for peak hours, while a fourth sharing pattern may be optimized for off-peak hours. Pattern database 722 therefore stores a plurality of sharing patterns that map radio resources in different ways. The sharing patterns may be indexed in pattern database 722 based on the pattern IDs assigned to each sharing pattern.

Although the above embodiments illustrates pattern manager 720 as generating the sharing patterns, the network operator may also predefine one or more of sharing patterns, and provide these predefined sharing patterns to pattern manager 720 for storage in pattern database 722.

FIGS. 9-11 illustrate sharing patterns in an exemplary embodiment. The mappings provided in FIGS. 9-11 are merely to provide exemplary mappings, and resource sharing as described herein is not limited to these sharing patterns. FIG. 9 illustrates a sharing pattern 900 (or a portion of sharing pattern 900) in an exemplary embodiment. In this embodiment, a mapping is provided for the MTC control channel (MPDCCH), a DL data channel (PDSCH), and a UL data channel (PUSCH). In a coverage enhancement mode, the MPDCCH is repeated over a plurality of sub-frames to allow a UE to determine the control information carried by the MPDCCH even in a poor coverage area. The MDPCCH is an example of control information, with the control information being any information which schedules DL radio resources for radio transmission from a base station to a UE and/or UL radio resources for radio transmission from a UE to a base station. MPDCCH, PDSCH, and PUSCH may be mapped to particular narrowbands/subcarriers which are not specifically illustrated in FIG. 9. For this mapping, MPDCCH is on a separate narrowband from PDSCH, MPDCCH repetition is four (with $R_{max}=4$), PDSCH repetition is four, PUSCH repetition is eight, and the DL Invalid BL/CE sub-frame is at sub-frame seven. Sharing pattern 900 has a 20 ms duration (=2 frames=20 sub-frames). The example in FIG. 9 shows a resource sharing window of 40 ms so that the repetition of pattern 900 is evident (i.e., pattern 900 is repeated twice in the resources sharing window).

The mapping in the time domain for sharing pattern 900 is per sub-frame. The sub-frames are illustrated as [0-9] for frame0 and [0-9] for frame1. A "U" label in a sub-frame indicates a mapping of that sub-frame for a UL MTC transmission, and a "D" label in a sub-frame indicates a mapping for a DL MTC transmission. For example, sub-frames [0-3] are mapped to the MPDCCH for UL MTC control, and sub-frames [4-6, 8] are mapped to the MPDCCH for DL MTC control. Sub-frames [7-14] are mapped to the PUSCH for UL MTC data transmission, and sub-frames [10-16, 18] are mapped to the PDSCH for DL MTC data transmission. The rest of the sub-frames that are not specifically mapped to MTC control or data are available or mapped to non-MTC (UL/DL) transmissions. Further, other radio resources not shown in FIG. 9 may also be available or mapped to non-MTC (UL/DL) transmissions.

MTC sub-frames may be mapped in such a way to ensure that less than 50% of the sub-frames are mapped to MTC, which ensures that scheduling mechanism 710 has the opportunity to transmit using the HARQ mechanism. For example, in FIG. 9, eight sub-frames are reserved out of twenty for MTC transmissions on the MPDCCH. In situations where scheduling mechanism 710 is fully busy with DL transmissions before the MTC transmissions (i.e., prior to frame0), retransmission can't occur on the MPDCCH during sub-frames [0-6 and 8], but is guaranteed to have a place during sub-frames [7 or 9-19]. Without this sharing pattern, scheduling mechanism 710 would have to determine at run time whether it's still suitable for the MPDCCH to occupy sub-frames [12-15], which in turn would link to either the logic of the PUSCH occupying sub-frames [19-26] or the PDSCH occupying sub-frames [18-25]. This would contribute to higher variance in processing time, which violates the principle of real-time processing and would require a deterministic run-time window.

Also, with the presence of invalid DL BL/CE sub-frame (sub-frame [7]), "G" would have to be greater than 1 to avoid overlapping of the MPDCCH search space. Sharing pattern 900 is mapped to use G=1 instead to ensure that the MPDCCH would fall into the pattern boundary. Sharing pattern 900 takes into account that the MPDCCH search space starting at $n*G*R_{max}$ would take precedence over the previous overlapping one (i.e., $(n-1)*G*R_{max}$), and scheduling mechanism 710 has full control over the scheduling slot to avoid ambiguity.

FIG. 10 illustrates another sharing pattern 1000 (or a portion of sharing pattern 1000) in an exemplary embodiment. In this embodiment, the mapping is for UL MTC transmissions only. For example, sub-frames [0-3] are mapped to the MPDCCH for UL MTC control, and sub-frames [7-14] are mapped to the PUSCH for UL MTC data transmission. The rest of the sub-frames that are not specifically mapped to MTC control or data are available or mapped to non-MTC (UL/DL) transmissions.

FIG. 11 illustrates another sharing pattern 1100 (or a portion of sharing pattern 1100) in an exemplary embodiment. In this embodiment, the mapping is for DL MTC transmission only. For example, sub-frames [4-7] are mapped to the MPDCCH for DL MTC control, and sub-frames [10-16, 18] are mapped to the PDSCH for DL MTC data transmission. The rest of the sub-frames that are not specifically mapped to MTC control or data are available or mapped to non-MTC (UL/DL) transmission.

The sharing patterns in FIGS. 9-10 are designed to start at the same location to give higher predictability to scheduling mechanism 710. For example, while processing a given sharing pattern x at sub-frame 0, scheduling mechanism 710 can predict that when a second sharing pattern y is selected, there's a guarantee that sub-frames [20-26] won't be used regardless of sharing pattern y. With this knowledge, scheduling mechanism 710 can be less conservative while processing some sub-frames during the processing of sharing pattern x to increase the throughput.

Figure 12:
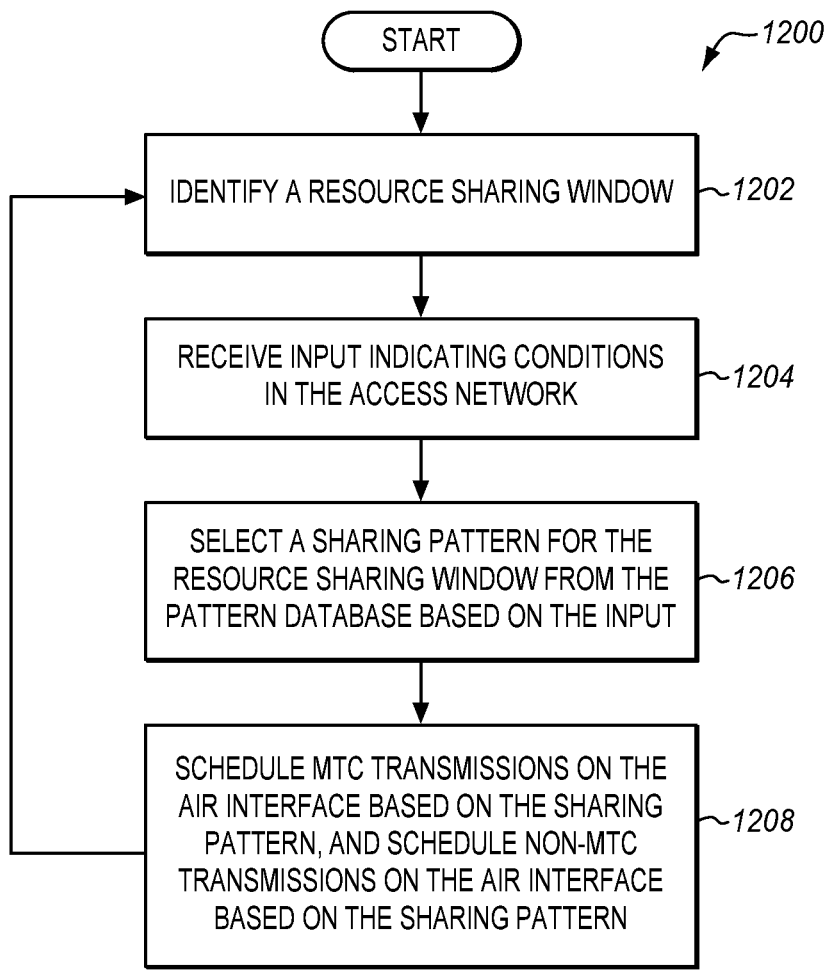
FIG. 12 is a flow chart illustrating a method of scheduling radio resources on an air interface in an exemplary embodiment.

With the sharing patterns defined and stored in pattern database 722, scheduling mechanism 710 is able to schedule MTC transmissions and non-MTC transmissions over the air interface to devices located in the same cell of an access network (e.g., access network 120). FIG. 12 is a flow chart illustrating a method 1200 of scheduling radio resources on an air interface in an exemplary embodiment. The steps of method 1200 will be described with reference to access network element 700 in FIG. 7, but those skilled in the art will appreciate that method 1200 may be performed in other networks or architectures.

Scheduling mechanism 710 identifies a resource sharing window (step 1202). As described above, the resource sharing window is a time period where both MTC and non-MTC transmissions are scheduled on the air interface. Scheduling mechanism 710 also receives input indicating conditions in the access network (step 1204). The input may vary as desired. In one embodiment, the input may comprise traffic information for the access network, such as MTC traffic load, non-MTC traffic load, traffic load in the cell, or other conditions in the access network. Scheduling mechanism 710 selects a sharing pattern for the resource sharing window from pattern database 722 based on the input (step 1206). Scheduling mechanism 710 may select the sharing pattern for the resource sharing window based on the selection criteria assigned to the sharing patterns in pattern database 722. For example, scheduling mechanism 710 may select the sharing pattern based on the traffic load in the access network as received in the input. Scheduling mechanism 710 may identify a TOD/DOW or peak/off-peak time, and select the sharing pattern based on these time conditions. Scheduling mechanism 710 may consider the weight factors assigned by the network operator in selecting the sharing pattern. At the beginning of the resource sharing window, scheduling mechanism 710 schedules MTC transmissions on the air interface based on the sharing pattern, and schedules non-MTC transmissions on the air interface based on the sharing pattern (step 1208). Due to the sharing pattern selected by scheduling mechanism 710, the radio resources of the air interface are shared between MTC and non-MTC. And, the sharing of radio resources may be optimized because scheduling mechanism 710 selects the sharing pattern based on conditions within the access network.

Method 1200 may then repeat for the next resource sharing window. Scheduling mechanism 710 may continue to use the sharing pattern in next resource sharing window if the traffic conditions in the access network or other conditions stay substantially the same. Otherwise, scheduling mechanism 710 may select a different sharing pattern for the next resources sharing window based on the present conditions in the access network (e.g., new traffic load).

Figure 13:
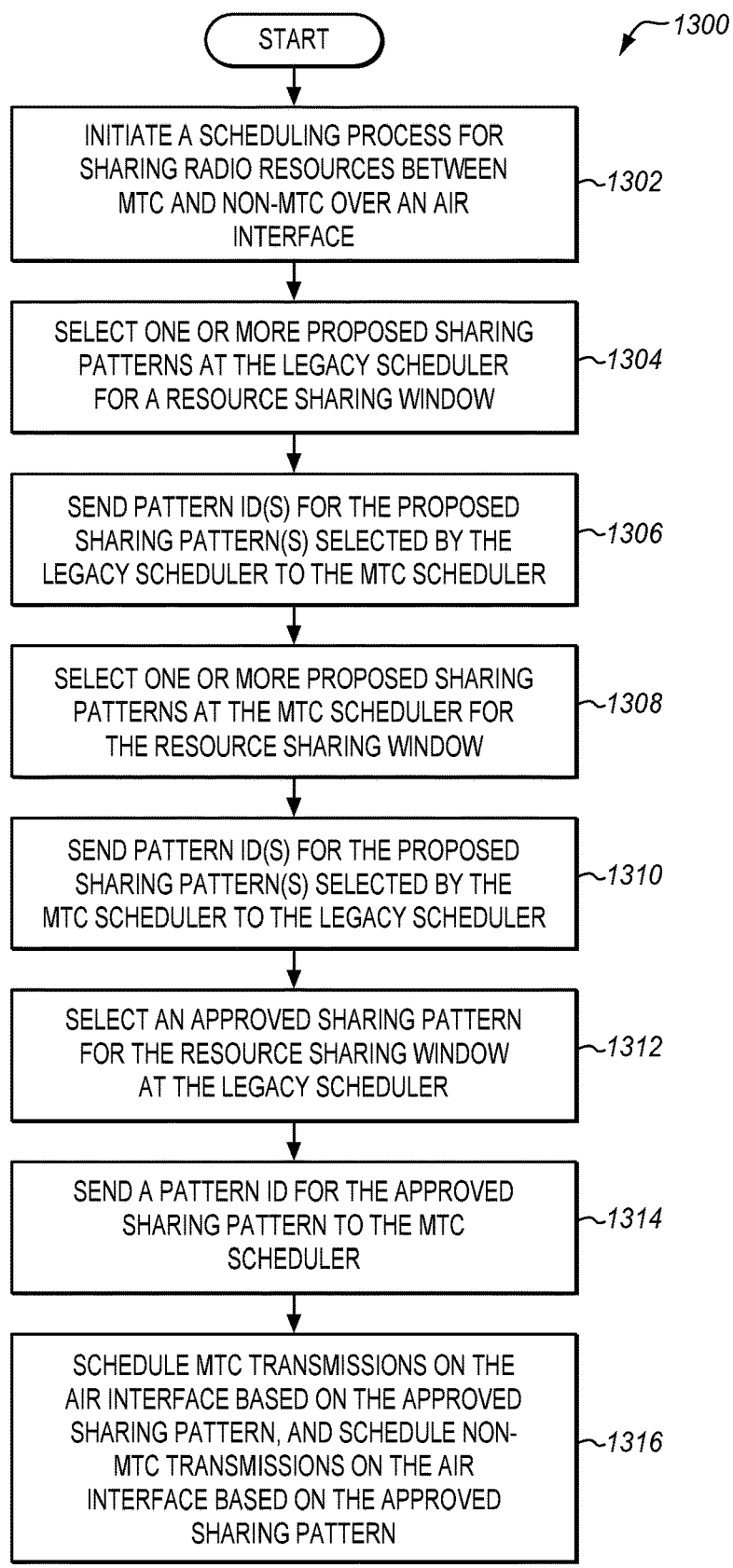
FIG. 13 is a flow chart illustrating a method of scheduling radio resources on an air interface in an exemplary embodiment.

When scheduling mechanism 710 implements MTC scheduler 712 and legacy scheduler 714 as separate elements (see FIG. 7), MTC scheduler 712 and legacy scheduler 714 may exchange communications to determine which sharing pattern is selected for a resource sharing window. FIG. 13 is a flow chart illustrating a method 1300 of scheduling radio resources on an air interface in an exemplary embodiment. The steps of method 1300 will be described with reference to access network element 700 in FIG. 7, but those skilled in the art will appreciate that method 1300 may be performed in other networks or architectures.

Scheduling mechanism 710 initiates a scheduling process for sharing radio resources between MTC and non-MTC over the air interface at a cell of an access network (e.g., access network 120) (step 1302). For the scheduling process, legacy scheduler 714 selects one or more proposed sharing patterns for the resource sharing window from pattern database 722 (step 1304). Legacy scheduler 714 selects the proposed sharing pattern(s) based on the selection criteria assigned to the sharing patterns, conditions in the access network, input from the network operator, etc. For example, legacy scheduler 714 may identify the present load in the access network for legacy traffic, and select the proposed sharing pattern(s) based on the load conditions. Legacy scheduler 714 may identify a TOD/DOW or peak/off-peak time, and select the proposed sharing pattern(s) based on these time conditions. Legacy scheduler 714 then sends a pattern ID(s) for the proposed sharing pattern(s) to MTC scheduler 712 (step 1306). For example, legacy scheduler 714 may send a message to MTC scheduler 712 indicating the pattern ID(s) over an interface, a shared bus, etc.

MTC scheduler 712 receives the pattern ID(s) for the proposed sharing pattern(s) selected by legacy scheduler 714. MTC scheduler 712 selects one or more proposed sharing patterns for the resource sharing window from pattern database 722 (step 1308). MTC scheduler 712 selects the proposed sharing pattern(s) based on the selection criteria assigned to the sharing patterns, conditions in the access network, input from the network operator, etc. For example, MTC scheduler 712 may identify the present load in the access network for MTC traffic, and select the proposed sharing pattern(s) based on the load conditions. MTC scheduler 712 may identify a TOD/DOW or peak/off-peak time, and select the proposed sharing pattern(s) based on these time conditions. MTC scheduler 712 may also consider the proposed sharing pattern(s) selected by legacy scheduler 714. MTC scheduler 712 then sends a pattern ID(s) for the proposed sharing pattern(s) to legacy scheduler 714 (step 1310).

Legacy scheduler 714 then selects an approved sharing pattern for the resource sharing window (step 1312) based on the proposed sharing pattern(s) from legacy scheduler 714 and MTC scheduler 712, and sends a pattern ID for the approved sharing pattern to MTC scheduler 712 (step 1314). For example, legacy scheduler 714 may look for a match between the proposed sharing patterns from legacy scheduler 714 and MTC scheduler 712, and negotiate if there is not a match (see FIG. 14). In another embodiment, the network operator may give legacy scheduler 714 final control over which sharing pattern is ultimately selected for the resource sharing window. Thus, legacy scheduler 714 may process the proposed sharing patterns that it selected, and process the proposed sharing patterns selected by MTC scheduler 712 to select which of the proposed sharing patterns is used for the resource sharing window (referred to as the "approved" sharing pattern). In other embodiments, the network operator may give MTC scheduler 712 final control over which sharing pattern is ultimately selected for the resource sharing window. In that case, legacy scheduler 714 may select the approved sharing pattern based on the proposed sharing pattern(s) selected by MTC scheduler 712.

At the beginning of the resource sharing window, MTC scheduler 712 schedules MTC transmissions on the air interface based on the approved sharing pattern, and legacy scheduler 714 schedules non-MTC transmissions on the air interface based on the approved sharing pattern (step 1316). Method 1300 may then repeat for the next resource sharing window. MTC scheduler 712 may continue to use the approved sharing pattern in next resource sharing window if the traffic mode does not change, legacy scheduler 714 does not send new proposed sharing patterns (step 1306), legacy scheduler 714 does not send a new approved sharing pattern (step 1314), etc.

Figure 14:
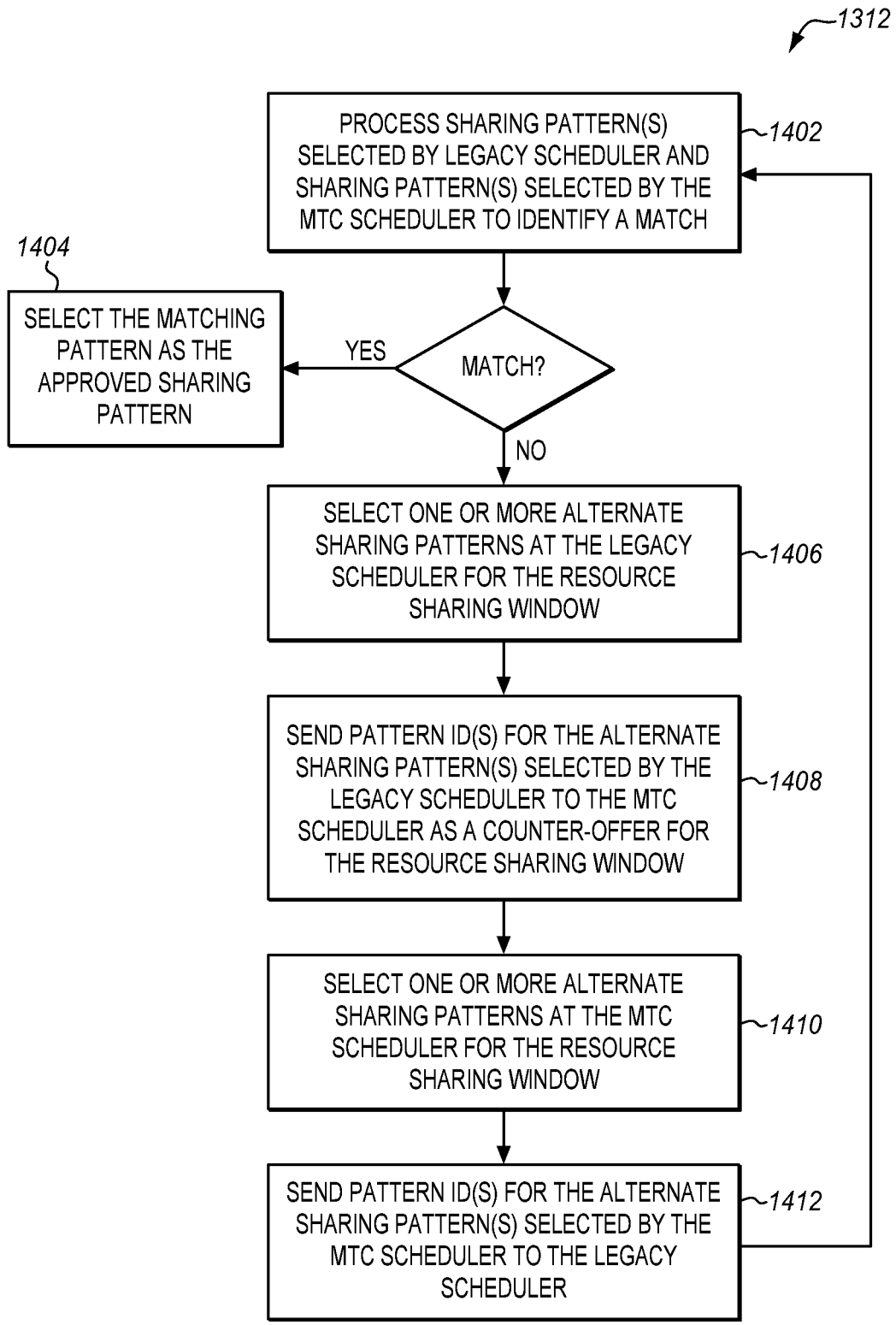
FIG. 14 is a flow chart illustrating steps of selecting an approved sharing pattern in an exemplary embodiment.

If MTC scheduler 712 and legacy scheduler 714 do not select the same pattern ID for the resource sharing window (i.e., no agreement), then legacy scheduler 714 may provide a counter-offer to MTC scheduler 712 before selecting the approved sharing pattern. FIG. 14 is a flow chart illustrating further steps of selecting an approved sharing pattern in an exemplary embodiment. Legacy scheduler 714 processes the proposed sharing pattern(s) that it selected, and the proposed sharing pattern(s) selected by MTC scheduler 712 to determine if there is a match (step 1402). If there is a match, then legacy scheduler 714 and MTC scheduler 712 have agreed on one of the proposed sharing patterns. Thus, legacy scheduler 714 selects this (i.e., the matching) proposed sharing pattern as the approved sharing pattern (step 1404). If there is not a match, then legacy scheduler 714 selects one or more alternate sharing patterns for the resource sharing window from pattern database 722 (step 1406). Legacy scheduler 714 then sends a pattern ID(s) for the alternate sharing pattern(s) to MTC scheduler 712 (step 1408) as a counter-offer for the resource sharing window. MTC scheduler 712 receives the pattern ID(s) for the alternate sharing pattern(s) selected by legacy scheduler 714. MTC scheduler 712 selects one or more alternate sharing patterns for the resource sharing window from pattern database 722 (step 1410). MTC scheduler 712 then sends a pattern ID(s) for the alternate sharing pattern(s) selected by MTC scheduler 712 to legacy scheduler 714 (step 1412). Processing then returns to step 1402 where legacy scheduler 714 processes the alternate sharing pattern(s) that it selected, and the alternate sharing pattern(s) selected by MTC scheduler 712 to determine if there is a match. Legacy scheduler 714 may continue to negotiate with MTC scheduler 712 until a match has been found.

In further embodiments, scheduling mechanism 710 (see FIG. 7) may use other policies to determine how radio resources are shared between MTC and non-MTC on the air interface. In the above embodiments, a sharing pattern is selected to be used for a resource sharing window. An additional policy may be implemented in scheduling mechanism 710 using an MTC reservation pattern. The MTC reservation pattern defines intervals where MTC transmissions are allowed, and intervals where MTC transmissions are prohibited. One or more MTC reservation patterns may be predefined or generated by pattern manager 720, and/or stored in pattern database 722.

In one embodiment, pattern manager 720 may generate the MTC reservation pattern. In such a case, pattern manager 720 determines a duration for the MTC reservation pattern, which may also be referred to as a reservation window. Pattern manager 720 defines one or more intervals where MTC is allowed. An interval is an amount of time in the time domain (e.g., a number of TTIs, a number of sub-frames, etc.). Pattern manager 720 also defines one or more intervals where MTC is prohibited. The intervals where MTC transmissions are allowed are referred to as "MTC-On" intervals, and MTC transmissions (control or data) are allowed to be scheduled during these intervals. Legacy or non-MTC transmissions may also be scheduled during the MTC-On intervals, such as based on the sharing patterns described above. In other words, the MTC-On intervals may represent resource sharing windows as discussed above.

The intervals where MTC transmissions are prohibited are referred to as "MTC-Off" intervals, and MTC transmissions (control or data) are not allowed to be scheduled during these intervals. Pattern manager 720 may define the MTC-On intervals and the MTC-Off intervals for the MTC reservation pattern based on conditions in the access network or other conditions. Also, pattern manager 720 may dynamically change the intervals in the MTC reservation pattern as desired.

Figure 15:
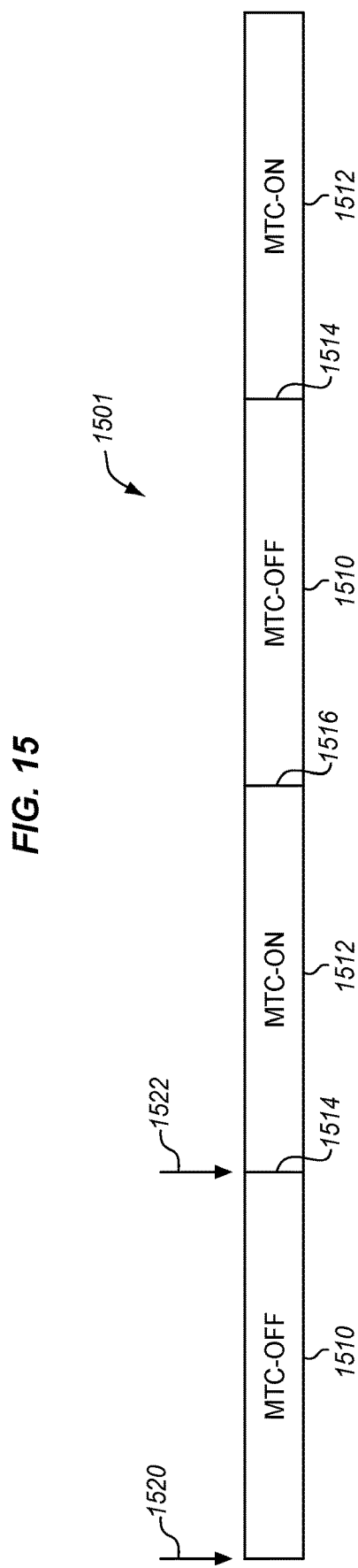
FIG. 15 illustrates an MTC reservation pattern with MTC-On and MTC-Off intervals in an exemplary embodiment.

FIG. 15 illustrates an MTC reservation pattern 1501 in an exemplary embodiment. Within MTC reservation pattern 1501, there are configurable MTC-Off intervals 1510 and MTC-On intervals 1512. MTC-Off intervals 1510 and MTC-On intervals 1512 are sequential in time for the duration of MTC reservation pattern 1501. Each interval 1510 and 1512 has a start time 1520 and an end time 1522. MTC reservation pattern 1501 includes transitions 1514 from an MTC-Off interval 1510 to an MTC-On interval 1512, and a transition 1516 from an MTC-On interval 1512 to an MTC-Off interval 1510. The sharing patterns or the resource sharing windows described above may be used within the MTC-On intervals 1512 of MTC reservation pattern 1501.

Figure 16:
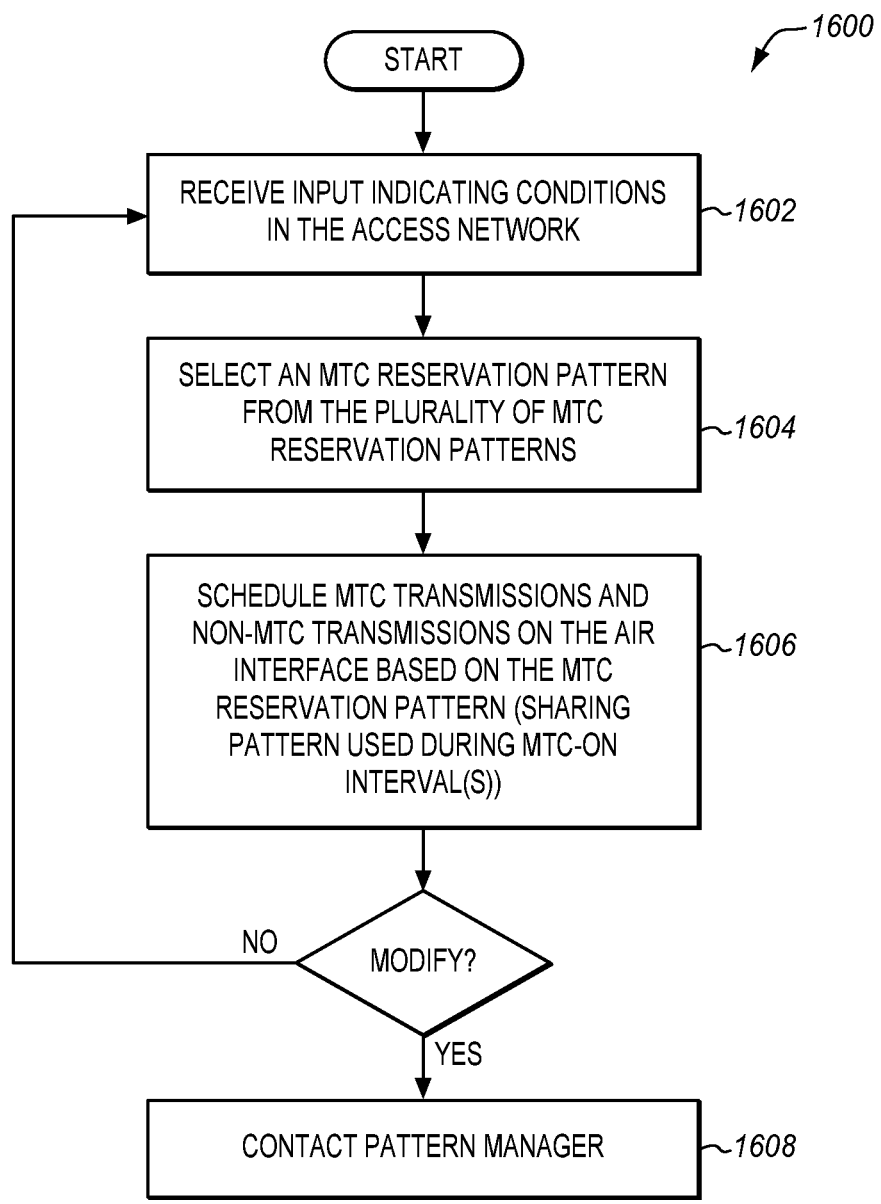
FIG. 16 is a flow chart illustrating a method of scheduling radio resources on an air interface in an exemplary embodiment.

FIG. 16 is a flow chart illustrating a method 1600 of scheduling radio resources on an air interface in an exemplary embodiment. The steps of method 1600 will be described with reference to access network element 700 in FIG. 7, but those skilled in the art will appreciate that method 1600 may be performed in other networks or architectures.

Scheduling mechanism 710 receives input indicating conditions in the access network (step 1602). Scheduling mechanism 710 selects an MTC reservation pattern from pattern database 722 based on the input (step 1604). Scheduling mechanism 710 schedules MTC transmissions on the air interface based on the MTC reservation pattern, and schedules non-MTC transmissions on the air interface based on the MTC reservation pattern (step 1606). The scheduling may be based both on the MTC reservation pattern and a sharing pattern as described above. The MTC reservation pattern describes one or more MTC-On intervals and one or more MTC-Off intervals. Scheduling mechanism 710 may select a sharing pattern to use during an MTC-On interval of the MTC reservation pattern.

Method 1600 may then repeat at the end of the MTC reservation pattern. Scheduling mechanism 710 may select a different MTC reservation pattern from pattern database 722 based on the present conditions in the access network (e.g., new traffic load). Alternatively, scheduling mechanism 710 may request that the MTC-On and MTC-Off intervals of the MTC reservation pattern are dynamically modified by contacting pattern manager 720 (step 1608). Pattern manager 720 may dynamically modify MTC-On and MTC-Off intervals of the MTC reservation pattern based on legacy traffic and/or MTC traffic within the access network, or other conditions in the access network. In this embodiment, legacy traffic loading measurements are compared with low/high thresholds to determine the sharing mode of the next reservation window. There are three MTC sharing modes defined herein: (1) low legacy load, where the legacy load is less than a low legacy load threshold; (2) mid-legacy load, where the legacy load is between the low legacy load threshold and a high legacy load threshold; and (3) high legacy load, where the legacy load is greater than the high legacy load threshold.

Scheduling mechanism 710 requests MTC-On/MTC-Off intervals for the next reservation window (e.g., xTTIs, where x can be configurable) before the start of the next reservation window. The MTC-On/MTC-Off intervals may apply to the DL narrowband used by the MPDCCH and PDSCH. The MTC-On/MTC-Off intervals may apply to the UL narrowband used by the PUSCH. Scheduling mechanism 710 is configured to determine the MTC-On and MTC-Off intervals for the next reservation window based on the requests from scheduling mechanism 710.

When the legacy "load usage ratio" is low (i.e., less than or equal to the low legacy load threshold), the final MTC-On interval equals the target reservation window if there is one or more MTC UE connections. Otherwise, the final MTC-On interval equals 0.

When the legacy "load usage ratio" is in the middle (i.e., greater than the low legacy load threshold but less than the high legacy load threshold), if the requested MTC-On interval (from scheduling mechanism 710) is greater than the target reservation window minus a number of TTIs (e.g., 40), then the final MTC-On interval equals the target reservation window. Otherwise, the final MTC-On interval equals the requested MTC-On interval.

When the legacy "load usage ratio" is high (i.e., greater than the high legacy load threshold), if the requested MTC-On interval is greater than the target reservation window minus the minimum MTC-On interval, then the final MTC-On interval equals the current MTC-On interval. Otherwise, the final MTC-On interval equals the minimum MTC-On interval or the requested MTC-On interval; whichever is greater.

The MTC-Off interval equals the target reservation window minus the final MTC-On interval.

The target reservation window is configurable to be ($n*R_{max}*G$), where n is the index of target sharing, $R_{max}$ is maximum PDCCH repetition number, and G is the common search space starting sub-frame.

The following illustrates ways to determine MTC-On intervals. The minimum MTC-On interval may be determined with the following equation:

$K*R_{max}*G$, where K is an index controlled by a parameter of "Index Of Minimum MTC-On interval".

If K is set to a non-zero value, a minimum MTC-On interval may be enforced even if there is no MTC traffic load in the current reservation window. The minimum MTC-On interval should be long enough in time to accommodate at least one UL or DL MTC data transmission.

The requested MTC-On interval is a time period (i.e., number of TTIs) requested by scheduling mechanism 710. The MTC-On interval dynamically changes depending on MTC traffic load and observed MTC narrowband unitization. Scheduling mechanism 710 (i.e., MTC scheduler 712) estimates the MTC load with x TTIs before the next scheduling mechanism 710 window. The requested MTC-On interval is used as the input to determine the final MTC-On interval. If the current MTC-On interval plus a factor S (S is a step increase in TTIs) is less than or equal to a number of TTIs required for the estimated MTC load, then the requested MTC-On interval equals the current MTC-On interval plus the factor S. If the number of TTIs required for the estimated MTC load is greater than the current MTC-On interval, then scheduling mechanism 710 determines if the current MTC load is greater than a high threshold (such as 80%). If so, then the requested MTC-On interval equals the current MTC-On interval plus the factor S. If not, then the requested MTC-On interval equals the current MTC-On interval. If the current MTC load is greater than a low threshold (such as 60%), then the requested MTC-On interval equals the current MTC-On interval. If the current MTC load is not greater than the low threshold (such as 60%), then the requested MTC-On interval equals the current MTC-On interval minus the factor S. The increase or decrease in step size (i.e., factor S) is equivalent to $n*R_{max}*G$, and the value of $n*R_{max}*G$ is less than or equal to eight TTIs.

If the total MTC load changes from the previous reservation window, then pattern manager 720 increases or decreases the length of the MTC-On interval in the next reservation window (i.e., modifies the MTC-On interval in the MTC reservation pattern). If the total node load is greater than or equal to $(K+1)*R_{max}$ and the MTC load usage ratio is greater than the high traffic load threshold, then the length of MTC-On interval is increased in the next reservation window. If the total node load is less than $(K+1)*R_{max}$ and the MTC load usage ratio is less than or equal to the low traffic load threshold, then the length of MTC-On interval is decreased in the next reservation window. Otherwise, the MTC-On interval is kept the same in the next reservation window.

Resource sharing as described above is beneficial in that it allows predicable conditions in scheduling mechanism 710. Resource sharing can be dynamically changed by altering sharing patterns in the time domain, or selecting different sharing patterns. Also, network operators are able to generate a number of different sharing patterns that are tailored to specific conditions encountered in a network. The sharing patterns can combine very complicated traffic modes and other filtering criteria so that use of the air interface is optimized for MTC and legacy transmissions.

Figure 17:
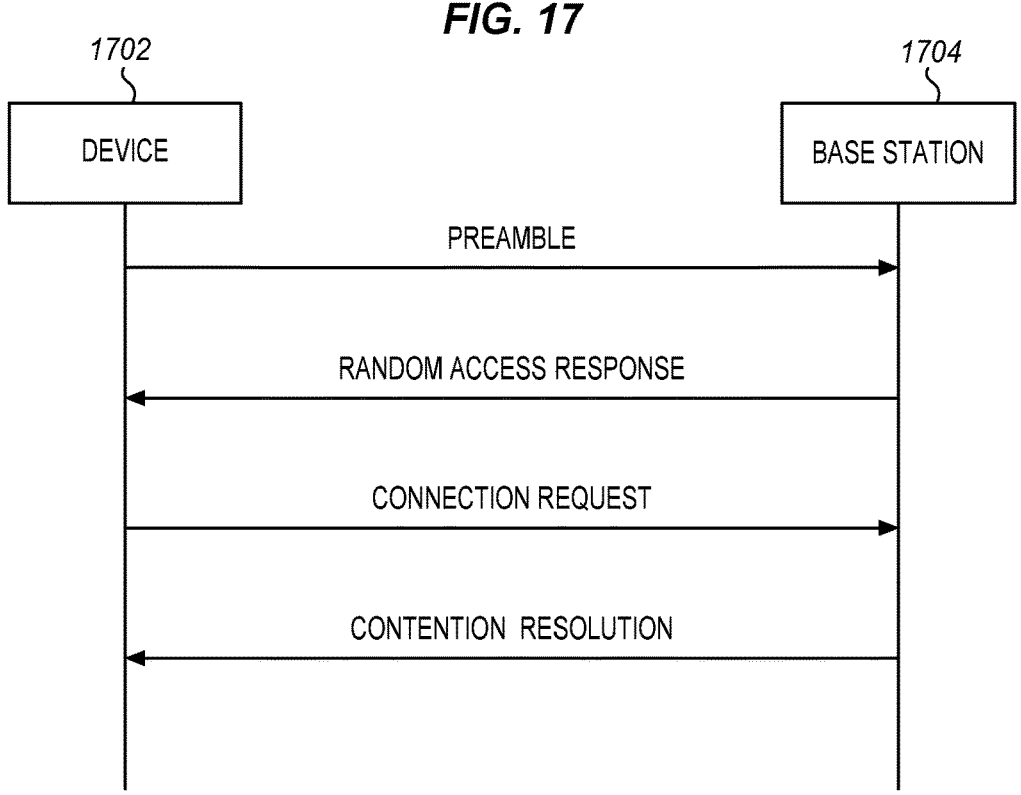
FIG. 17 illustrates a contention-based random access procedure.

In another embodiment, devices initiate a random access procedure over a Random Access Channel (RACH) to access the access network. The random access procedure may occur upon initial access by the device, during an RRC connection re-establishment procedure, upon handover, when UL synchronization is lost, when the device does not have any PUCCH resources available for a scheduling request, when timing advance is needed, etc. FIG. 17 illustrates a contention-based random access procedure. This random access procedure includes the exchange of four messages between a device 1702 (e.g., UE) and a base station 1704 (e.g., eNodeB). For message-1, device 1702 selects one of the 64 available RACH preambles, and sends the preamble to base station 1704. The RACH preamble is a specific pattern or signature, and the preamble value differentiates requests coming from different devices. For message-2, base station 1704 calculates an identity for device 1702 (i.e., a Random Access Radio Network Temporary Identity (RA-RNTI)) from the RACH preamble, and sends a Random Access Response (RAR) to device 1702 on the DL-SCH (Downlink Shared Channel) addressed to the RA-RNTI. The RAR includes a temporary Cell Radio Network Temporary Identity (C-RNTI) given by base station 1704 for further communication, a timing advance value so that device 1702 may change its timing to compensate for the round trip delay caused the distance between device 1702 and base station 1704, and an uplink grant resource so that device 1702 can use the UL-SCH (Uplink Shared Channel).

For message-3, device 1702 sends an RRC connection request message to base station 1704 using the UL-SCH. The RRC connection request message includes an identity for device 1702 (e.g., Temporary Mobile Subscriber Identity (TMSI) or Random Value). The TMSI is used if device 1702 has previously connected to the network, and the random value is used when device 1702 is initially connecting to the network. The RRC connection request message also includes a connection establishment cause, which indicates the reason why device 1702 needs to connect to the network. For message-4, base station 1704 responds to device 1702 with a contention resolution message acknowledging successful receipt of the RRC connection request message. The contention resolution message is addressed towards the TMSI value or random number, and includes a new C-RNTI which is used for further communication.

Figure 18:
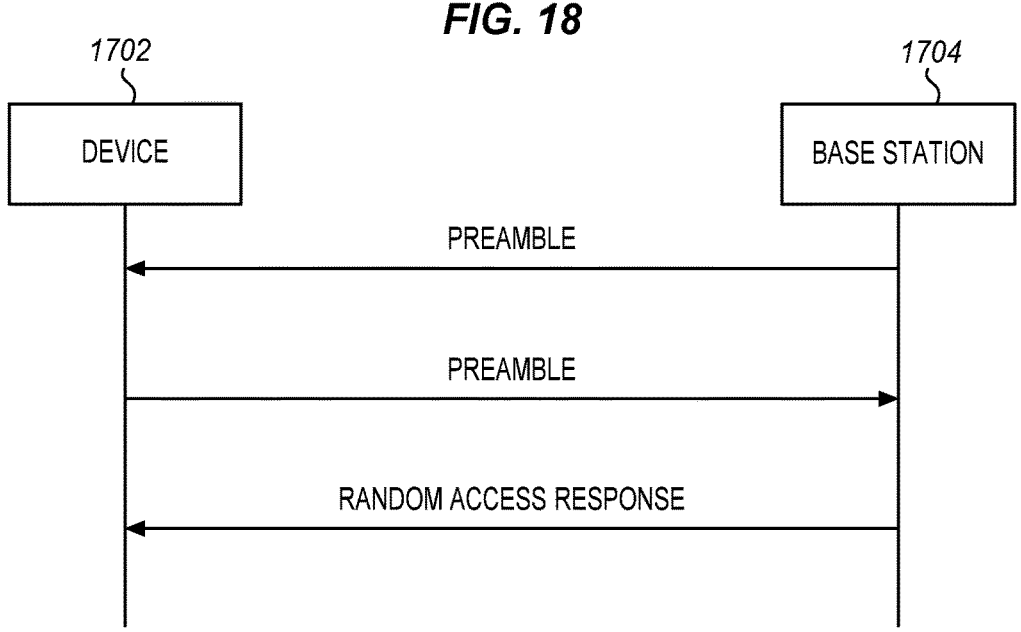
FIG. 18 illustrates a contention-free random access procedure.

FIG. 18 illustrates a contention-free random access procedure. Instead of device 1702 selecting one of the 64 available RACH preambles as in the contention-based example, base station 1704 actually assigns a preamble to device 1702. Thus, base station 1702 sends the preamble to device 1702. For message-1, device 1702 sends the preamble back to base station 1704. Base station 1704 calculates the identity for device 1702 (i.e., RA-RNTI) from the RACH preamble. For message-2, base station 1704 sends a Random Access Response (RAR) to device 1702 on the DL-SCH (Downlink Shared Channel) addressed to the RA-RNTI. The RAR includes a temporary C-RNTI given by base station 1704 for further communication, a timing advance value so that device 1702 may change its timing to compensate for the round trip delay caused the distance between device 1702 and base station 1704, and an uplink grant resource so that device 1702 can use the UL-SCH.

MTC devices also use a random access procedure over the RACH (which may be referred to as an MTC RACH or M-RACH) when contacting an access network. The above embodiments described scheduling on the air interface using an MTC reservation pattern that includes MTC-On intervals and MTC-Off intervals (see FIG. 15). It may be detrimental to network performance if the MTC-On intervals and MTC-Off intervals are defined in such a way that blocks the random access procedure for MTC devices. In this embodiment, scheduling mechanism 710 and/or pattern manager 720 (see FIG. 7) manages the MTC-On intervals and MTC-Off intervals of an MTC reservation pattern to improve performance of the random access procedure for MTC devices.

Figure 19:
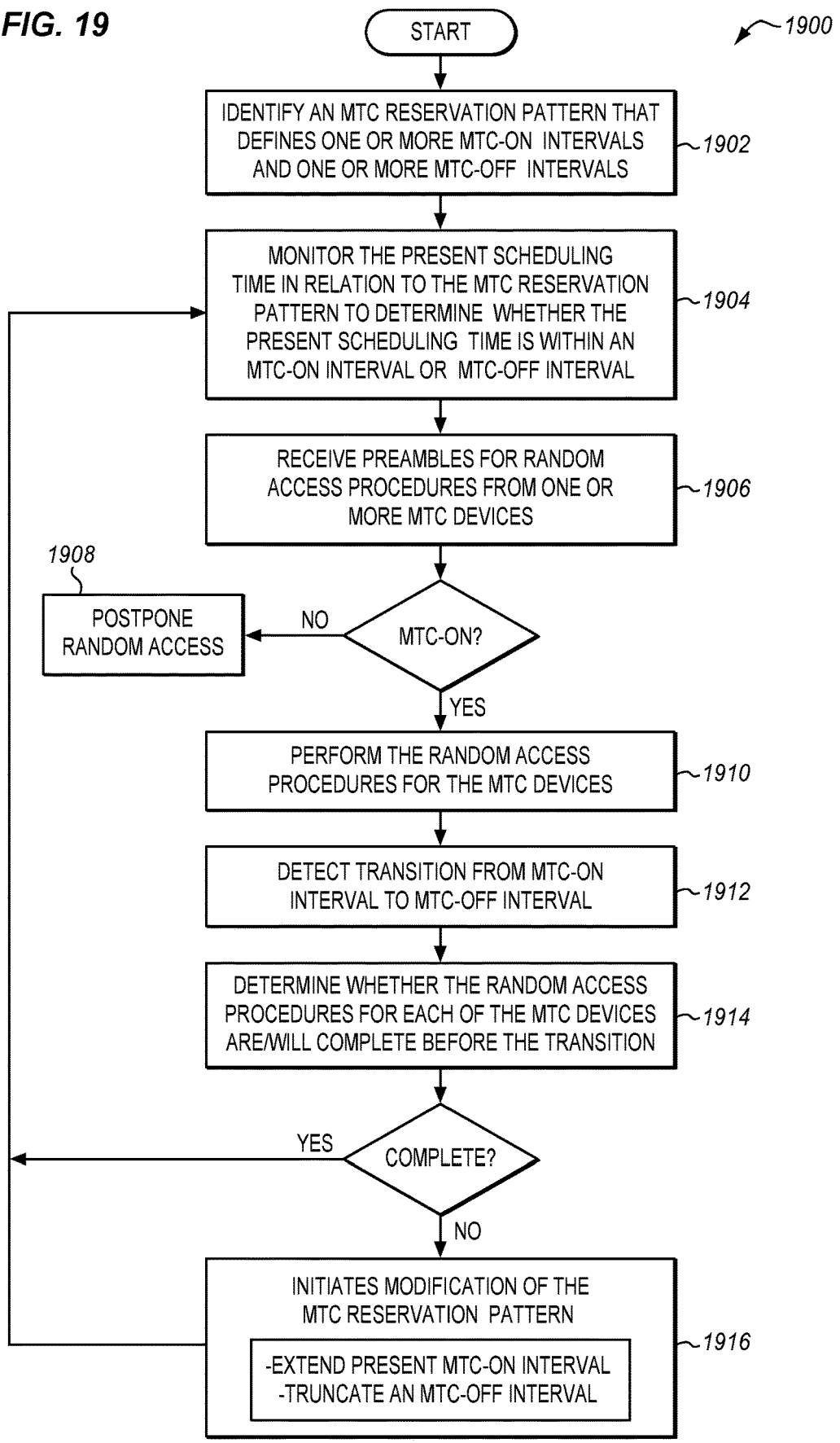
FIG. 19 is a flow chart illustrating a method of managing random access procedures in an exemplary embodiment.

FIG. 19 is a flow chart illustrating a method 1900 of managing random access procedures in an exemplary embodiment. The steps of method 1900 will be described with reference to access network element 700 in FIG. 7, but those skilled in the art will appreciate that method 1900 may be performed in other networks or architectures.

For this embodiment, it is assumed that one or more MTC devices are located within a cell of access network element 700. Scheduling mechanism 710 (or MTC scheduler 712) identifies an MTC reservation pattern that defines at least one MTC-On interval and at least one MTC-Off interval (step 1902). Scheduling mechanism 710 is allowed to schedule MTC transmissions during the MTC-On intervals, and prevents MTC transmissions during the MTC-Off intervals.

Scheduling mechanism 710 tracks the MTC devices in the cell by monitoring the M-RACH. While handling the random access procedure for one or more of the MTC devices, scheduling mechanism 710 also continually monitors the present scheduling time in relation to the MTC reservation pattern to determine whether the present scheduling time is within/during an MTC-On interval or an MTC-Off interval (step 1904). While monitoring the M-RACH, scheduling mechanism 710 receives preambles (e.g., message-1) for random access procedures from one or more MTC devices (step 1906). When the preambles are received during an MTC-Off interval, scheduling mechanism 710 postpones random access to the MTC devices (step 1908) until the next MTC-On interval. When the preambles are received during an MTC-On interval, scheduling mechanism 710 performs the random access procedures for the MTC devices (step 1910). This entails responding to the MTC devices with RAR messages, contention resolution messages, etc., in an attempt to complete each of the random access procedures.

As random access procedures are handled in relation to the MTC reservation pattern during an MTC-On interval, scheduling mechanism 710 detects a transition from the MTC-On interval to an MTC-Off interval in the MTC reservation pattern (step 1912), and determines whether the random access procedures for each of the MTC devices are or will complete/finish before the transition (step 1914). In a contention-based scenario, the random access procedure may be considered complete if message-4 is sent, and further if following conditions are met: (1) no more messages of type "message-2" remain in a transmit queue or re-transmit queue of scheduling mechanism 710, (2) no more messages of type "message-3" remain in the transmit queue or re-transmit queue, and (3) no more on-going messages of types "message-2", "message-3", or "message-4" remain for a HARQ context. Scheduling mechanism 710 may determine whether a random access procedure will complete before the transition based on the minimum time required to complete a random access procedure. A random access procedure may take x TTIs to complete from message-1 to message-4 (contention-based). If the transition is less than x TTIs from the time a preamble (e.g., message-1) is received for a random access procedure, then scheduling mechanism 710 may determine that this random access procedure will not complete before the transition.

Responsive to a determination that the random access procedures for each of the MTC devices are/will complete before the transition, method 1900 returns to step 1904 where scheduling mechanism 710 monitors the present scheduling time in relation to the MTC reservation pattern to determine whether the present scheduling time is within an MTC-On interval or an MTC-Off interval. This may include switching states from an MTC-On interval to an MTC-Off interval at the transition as specified in the MTC reservation pattern.

Responsive to a determination that the random access procedures for each of the MTC devices are/will not complete before the transition, scheduling mechanism 710 initiates modification of the MTC reservation pattern (step 1916). Scheduling mechanism 710 and/or pattern manager 720 are configured to modify the MTC reservation pattern to convert at least a portion of an MTC-Off interval in the MTC reservation pattern to an MTC-On interval. To modify the MTC reservation pattern, scheduling mechanism 710 may send a message to pattern manager 720 (see FIG. 7) with a request to modify the MTC reservation pattern. In response, pattern manager 720 modifies the MTC reservation pattern based on policies or rules, and provides a modified MTC reservation pattern to scheduling mechanism 710. The MTC reservation pattern may be modified by extending the present MTC-On interval into the next MTC-Off interval until the random access procedures for each of the MTC devices are complete. In other words, the present MTC-On interval is extended and the transition to the MTC-Off interval is moved in time so that random access procedures, which initiated during this MTC-On interval, also complete during the same MTC-On interval. For example, if the next MTC-Off interval is 40 TTIs long, then the present MTC-On interval may be extended into the first 5 TTIs of the next MTC-Off interval so that the transition is shifted by 5 TTIs.

The MTC reservation pattern may be modified by truncating or shortening the next MTC-Off interval in the MTC reservation pattern, and reallocating the truncated portion as an MTC-On interval. Each interval (MTC-On/MTC-Off) in the MTC reservation pattern is defined by a start time and an end time (see FIG. 15). In modifying the MTC reservation pattern, the start time of the next MTC-Off interval may remain the same but a portion of the MTC-Off interval toward the end time of the MTC-Off interval would be "cut off" and reallocated as an MTC-On interval. When the MTC reservation pattern is modified in this manner, the state of the MTC reservation pattern will change to the next MTC-Off interval. However, the next MTC-Off interval (or another MTC-Off interval) will be truncated and an end portion (i.e., portion toward the end time of the MTC-Off interval) will be reallocated as an MTC-On interval. For example, if the next MTC-Off interval is 40 TTIs long, then the last 25 TTIs of the next MTC-Off interval may be reallocated as an MTC-On interval.

Method 1900 returns to step 1904 where scheduling mechanism 710 monitors the present scheduling time in relation to the MTC reservation pattern (modified or unmodified) to determine whether the present scheduling time is within an MTC-On interval or an MTC-Off interval. This may include switching between an MTC-Off interval and MTC-On interval, or vice-versa.

Figure 20:
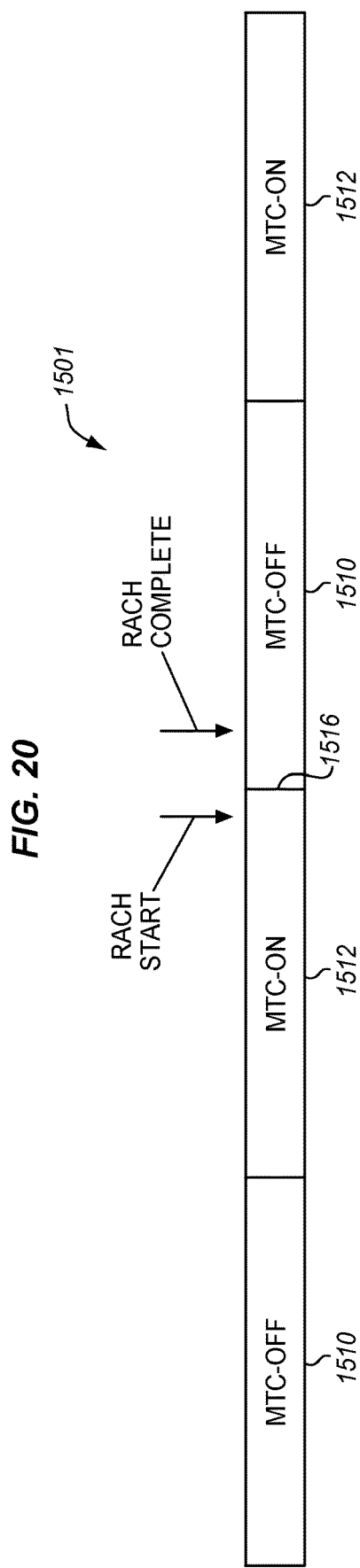
FIG. 20 illustrates the timing of a random access procedure in relation to an MTC reservation pattern in an exemplary embodiment.

FIG. 20 illustrates the timing of a random access procedure in relation to MTC reservation pattern 1501 in an exemplary embodiment. In the scenario shown in FIG. 20, a traditional MTC scheduler may receive a preamble (i.e., RACH start) from an MTC device toward the end of an MTC-On interval 1512. In this scenario, the random access procedure may not end during the MTC-On interval 1512, which means that one or more subsequent messages (i.e., RACH complete) would be received during an MTC-Off interval 1510. Because MTC transmissions are prohibited during MTC-Off intervals 1510, the random access procedure are postponed until the next MTC-On interval 1512. This is undesirable, as the MTC device will continue to re-transmit preambles in an attempt to connect, which wastes the battery of the MTC device.

Dynamic modification of MTC reservation patterns as provided in method 1900 helps to resolve these issues. In the following embodiments, pattern manager 720 is tasked with modifying the MTC reservation pattern if needed, but scheduling mechanism 710, MTC scheduler 712, or another device could modify the MTC reservation pattern. It is assumed now that scheduling mechanism 710 is initially implementing MTC reservation pattern 1501 as shown in FIG. 20, and the scheduling time is within an MTC-On interval 1510. In this scenario, scheduling mechanism 710 receives a preamble (i.e., RACH start) from an MTC device.

Figure 21:
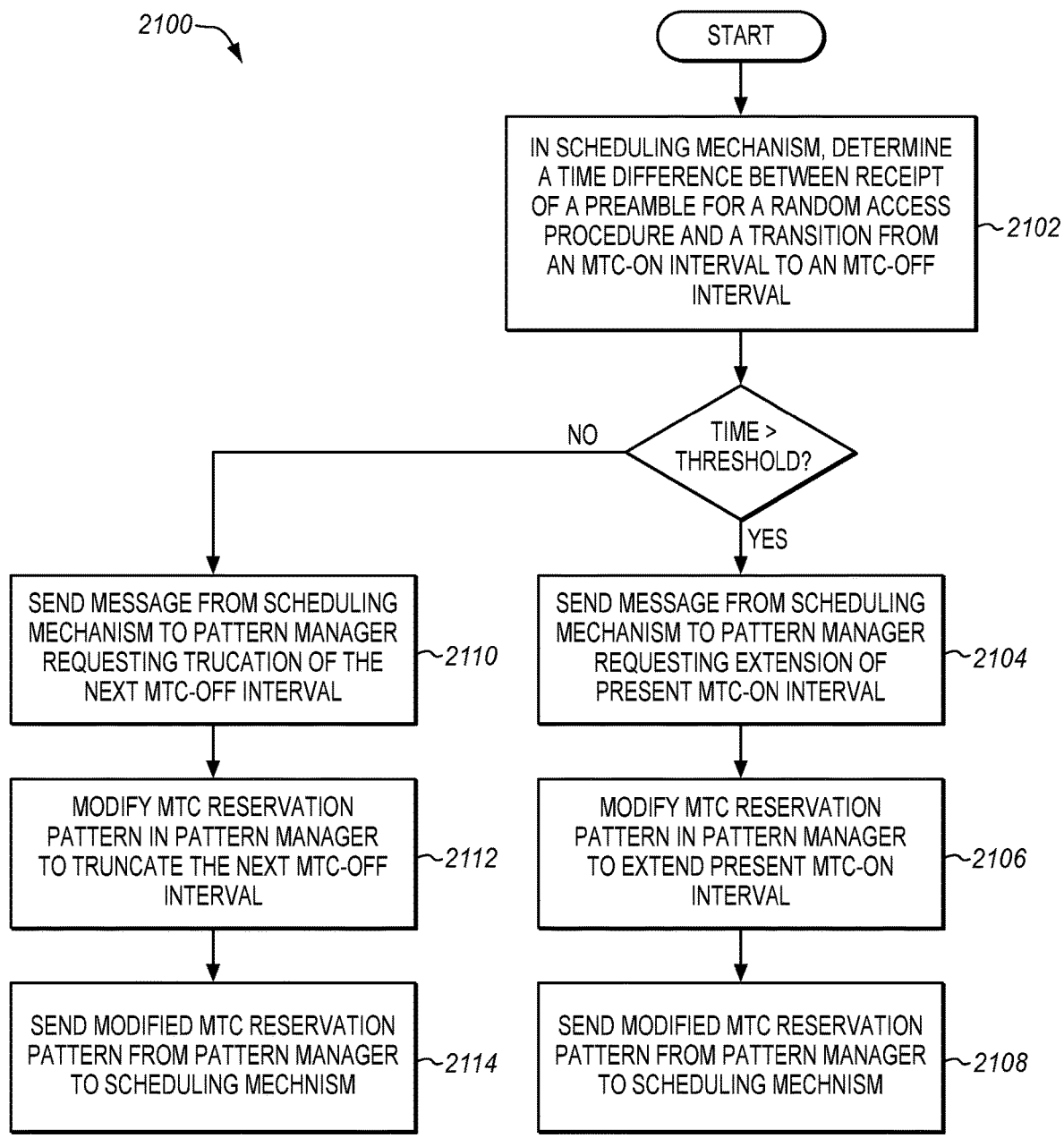
FIG. 21 is a flow chart illustrating a method of modifying an MTC reservation pattern in an exemplary embodiment.

Scheduling mechanism 710 detects the transition 1516 from the MTC-On interval 1512 to an MTC-Off interval 1510, and determines that the random access procedure will not complete before transition 1516. FIG. 21 is a flow chart illustrating a method 2100 of modifying the MTC reservation pattern 1501 in an exemplary embodiment. In this embodiment, scheduling mechanism 710 is programmed to determine a time difference between receipt of the preamble for the random access procedure and transition 1516 (step 2102). If the time difference is greater than a threshold, then there is time for pattern manager 720 to modify MTC reservation pattern 1501 before reaching transition 1516. In other words, there is time to extend the present MTC-On interval 1512 before switching to the next MTC-Off interval 1510. Thus, scheduling mechanism 710 sends a message to pattern manager 720 requesting modification of the MTC reservation pattern 1501 (step 2104). The message may request extension of the present MTC-On interval. In response to the message, pattern manager 720 modifies the MTC reservation pattern 1501 based on policies or rules to extend the present MTC-On interval 1512 (step 2106), and pattern manager 720 sends a modified MTC reservation pattern (step 2108) that is received by scheduling mechanism 710. Scheduling mechanism 710 then continues to handle random access procedures based on the modified MTC reservation pattern.

Figure 22:
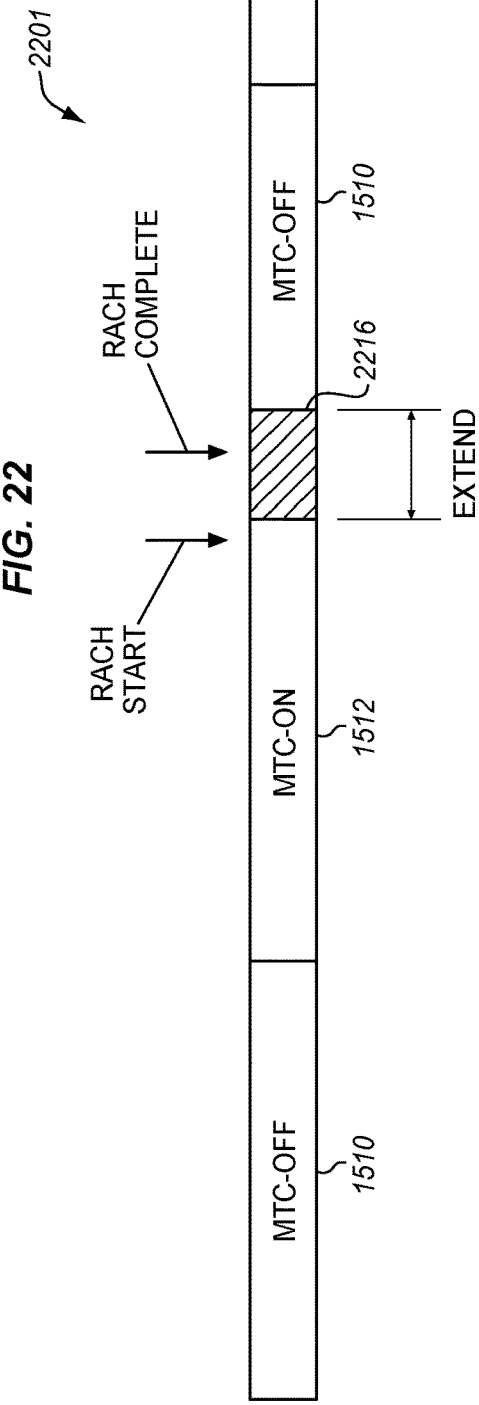
FIG. 22 illustrates a modified MTC reservation pattern in an exemplary embodiment.

FIG. 22 illustrates a modified MTC reservation pattern 2201 in an exemplary embodiment. In modified MTC reservation pattern 2201, the present MTC-On interval 1512 is extended into the next MTC-Off interval 1510. The MTC-On interval 1512 may extend into the next MTC-Off interval 1510 by one or more TTIs as configured by pattern manager 720. Thus, the transition 2216 between the present MTC-On interval 1512 and the next MTC-Off interval 1510 has been moved in time so that the present MTC-On interval 1512 is expanded. MTC reservation pattern 2201 may continue to be modified in this manner until all pending random access procedures have completed for the present MTC-On interval 1512.

In FIG. 21, if the time difference is less than the threshold, then there may not be time for pattern manager 720 to modify MTC reservation pattern 1501 before reaching transition 1516. Scheduling mechanism 710 sends a message to pattern manager 720 requesting modification of the MTC reservation pattern 1501 (step 2110). The message may request truncating of the next MTC-Off interval. In response to the message, pattern manager 720 modifies MTC reservation pattern 1501 based on policies or rules to truncate the next MTC-Off interval 1510 and reallocate a truncated portion of the next MTC-Off interval 1510 as another MTC-On interval (step 2112). Pattern manager 720 then sends a modified MTC reservation pattern (step 2114) that is received by scheduling mechanism 710. Scheduling mechanism 710 then continues to handle random access procedures based on modified MTC reservation pattern.

Figure 23:
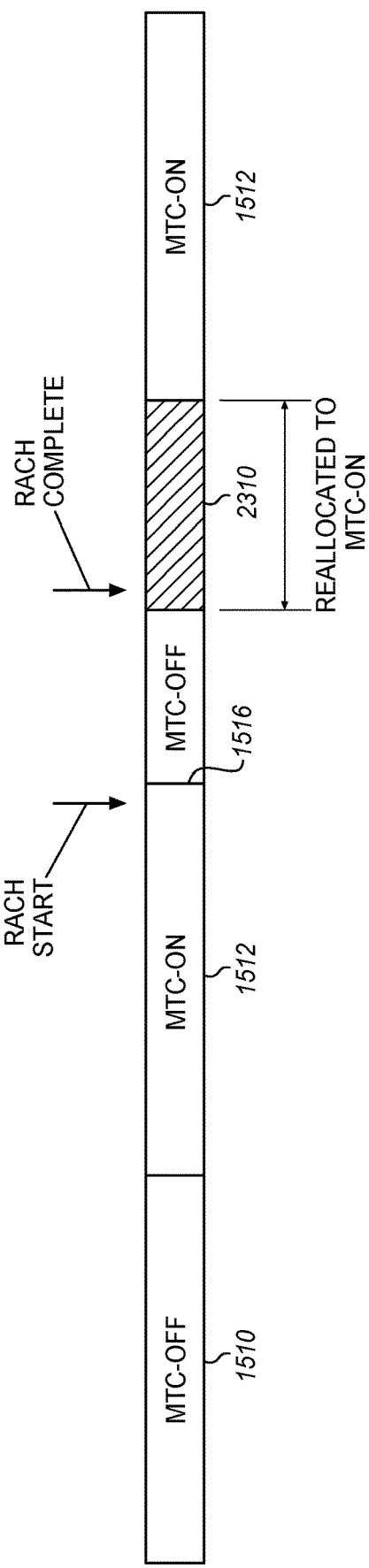
FIG. 23 illustrates a modified MTC reservation pattern in an exemplary embodiment.

FIG. 23 illustrates another modified MTC reservation pattern 2301 in an exemplary embodiment. In modified MTC reservation pattern 2301, the transition 1516 between the present MTC-On interval 1512 and the next MTC-Off interval 1510 remains at the same point in time. Thus, scheduling mechanism 710 will switch to the MTC-Off interval 1510 at transition 1516, and suspend the random access procedure that was active during the prior MTC-On interval 1512. However, the next MTC-Off interval 1510 is truncated, meaning that a portion 2310 of the next MTC-Off interval 1510 is reallocated to an MTC-On interval 1512. The portion 2310 being reallocated is the end portion (i.e., portion toward the end time of MTC-Off interval 1510) of the next MTC-Off interval 1510. Therefore, the random access procedure may be completed during the reallocated portion 2310 that is now an MTC-On interval 1512 in MTC reservation pattern 2301. This allows the random access procedure to complete faster than if the random access procedure had to wait until the next MTC-On interval 1512.

As random access procedures are postponed (step 1908 of FIG. 19) in relation to the MTC reservation pattern during an MTC-Off interval, scheduling mechanism 710 queues the preambles received during the MTC-Off interval as they cannot be completed during an MTC-Off interval. To handle these random access procedures to completion in an efficient manner, scheduling mechanism 710 may also initiate modification of the MTC reservation pattern during an MTC-Off interval. To modify the MTC reservation pattern, scheduling mechanism 710 may send a message to pattern manager 720 (see FIG. 7) with a request to modify the MTC reservation pattern. In response, pattern manager 720 modifies the MTC reservation pattern based on policies or rules, and provides a modified MTC reservation pattern to scheduling mechanism 710. The MTC reservation pattern may be modified by shortening the present MTC-Off interval. For example, if the present MTC-Off interval is 40 TTIs long, then the present MTC-Off interval may be shortened to 30 TTIs.

Figure 24:
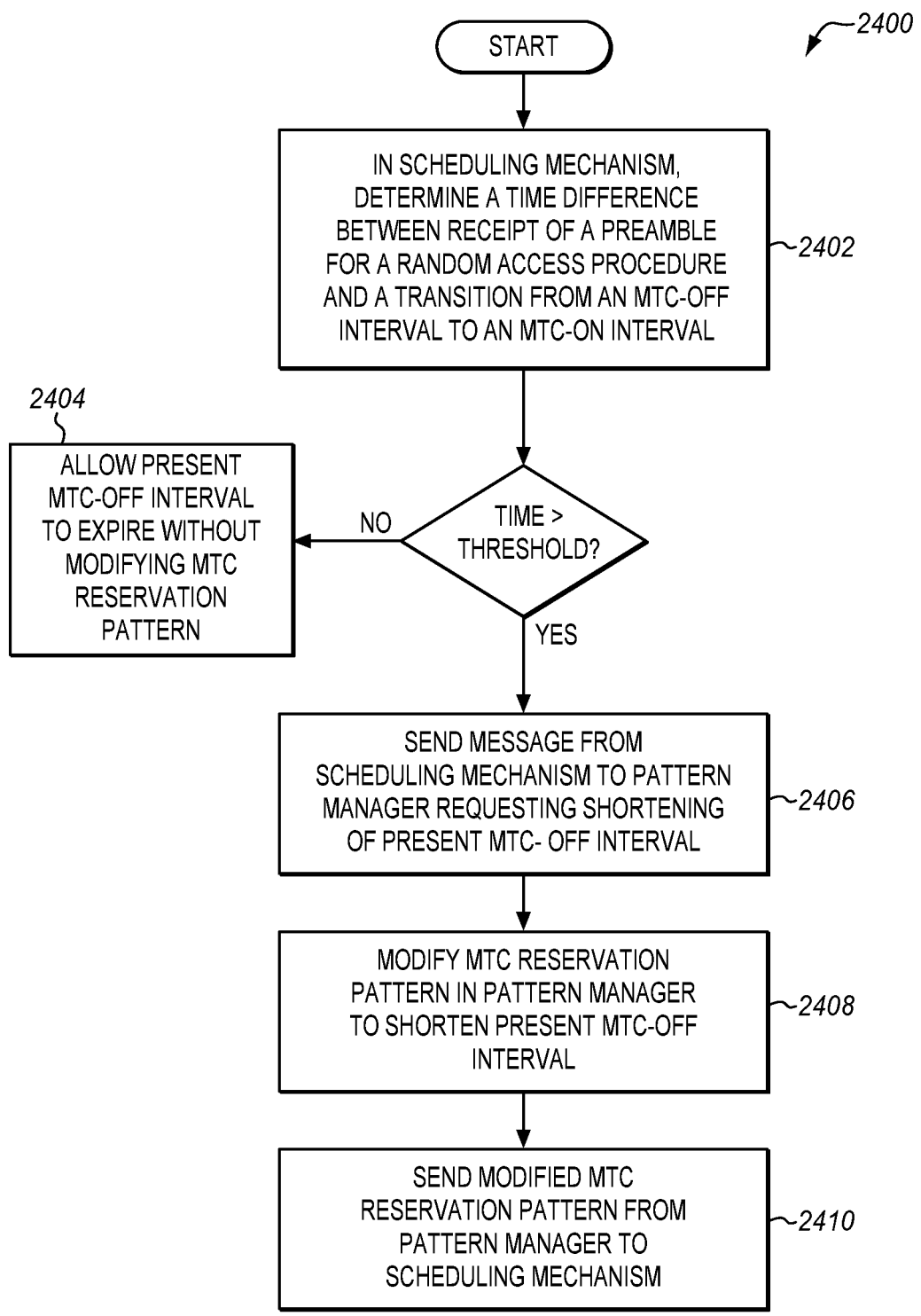
FIG. 24 is a flow chart illustrating a method of modifying an MTC reservation pattern in an exemplary embodiment.

FIG. 24 is a flow chart illustrating a method 2400 of modifying the MTC reservation pattern 1501 in an exemplary embodiment. In this embodiment, scheduling mechanism 710 is programmed to determine a time difference between receipt of the preamble for the random access procedure and a transition 1514 to the next MTC-On interval 1512 (step 2402). If the time difference is less than a threshold, then there may not be time for pattern manager 720 to modify MTC reservation pattern 1501 before reaching the transition 1514. Thus, scheduling mechanism 710 allows the present MTC-Off interval 1510 to expire without requesting modification of the MTC reservation pattern 1501 (step 2404).

If the time difference is greater than the threshold, then there is time for pattern manager 720 to modify MTC reservation pattern 1501 before reaching the transition 1514. In other words, there is time to modify the present MTC-Off interval 1510 before switching to the next MTC-On interval 1512. Thus, scheduling mechanism 710 sends a message to pattern manager 720 requesting modification of the MTC reservation pattern 1501 (step 2406). The message may request truncating or shortening of the present MTC-Off interval 1510. In response to the message, pattern manager 720 modifies the MTC reservation pattern 1501 based on policies or rules to truncate the present MTC-Off interval 1510 (step 2408), and pattern manager 720 sends a modified MTC reservation pattern (step 2410) that is received by scheduling mechanism 710. Scheduling mechanism 710 will then continue to handle random access procedures when the next MTC-On interval 1512 is reached in the modified MTC reservation pattern.

Figure 25:
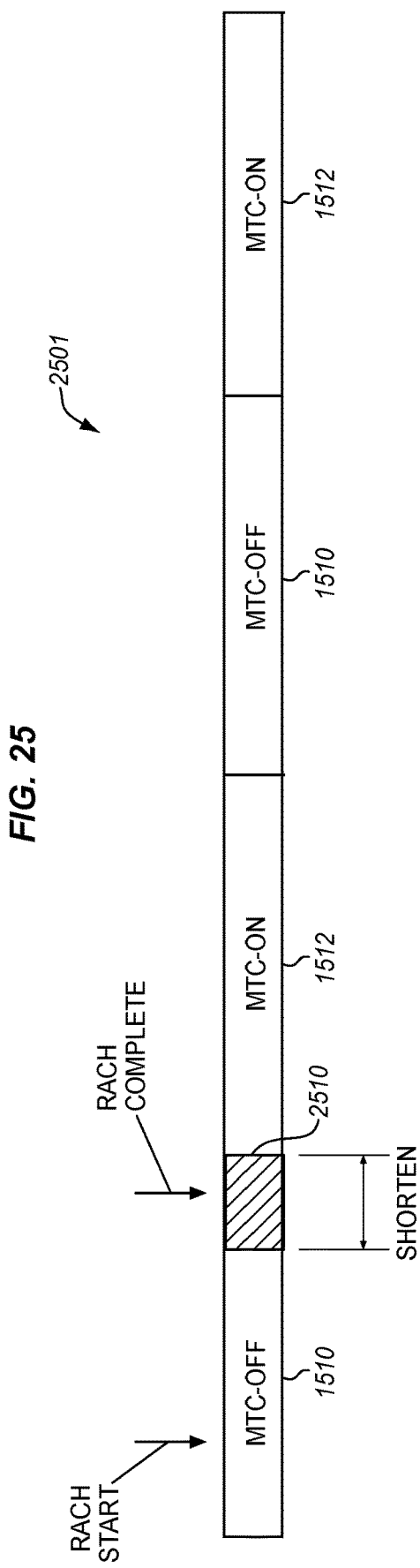
FIG. 25 illustrates a modified MTC reservation pattern in an exemplary embodiment.

FIG. 25 illustrates a modified MTC reservation pattern 2501 in an exemplary embodiment. In modified MTC reservation pattern 2501, the present MTC-Off interval 1510 is truncated, meaning that a portion 2510 of the present MTC-Off interval 1510 is reallocated to an MTC-On interval 1512. The portion 2510 being reallocated is the end portion (i.e., portion toward the end time of MTC-Off interval 1510) of the present MTC-Off interval 1510. Therefore, the random access procedure may be completed during the reallocated portion 2510 that is now an MTC-On interval 1512 in MTC reservation pattern 2501. This allows the random access procedure to complete faster than if the random access procedure had to wait until the next MTC-On interval 1512.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor (i.e., a computer-readable medium). Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

What is claimed is:

1. A system comprising:
   an access network element of an access network that is configured to communicate with a plurality of devices over an air interface, the access network element comprising:
   a pattern database configured to store a Machine-Type Communications (MTC) reservation pattern that defines at least one MTC-On interval where MTC is allowed, and defines at least one MTC-Off interval where MTC is prohibited;
   at least one processor; and, at least one memory including executable instructions; the at least one memory and the executable instructions configured to, with the at least one processor, cause the access network element to:
   identify the MTC reservation pattern from the pattern database;
   during an MTC-On interval of the MTC reservation pattern, receive preambles for random access procedures from MTC devices, and to perform the random access procedures for the MTC devices in response to the preambles;
   detect a transition from the MTC-On interval to a next MTC-Off interval in the MTC reservation pattern, and to determine whether the random access procedures for the MTC devices will complete before the transition;
   responsive to a determination that the random access procedures for the MTC devices will not complete before the transition, initiate modification of the MTC reservation pattern, determine a time difference between receipt of a preamble for a random access procedure and the transition from the MTC-On interval to the next MTC-Off interval, send a first message to a pattern manager requesting extension of the MTC-On interval when the time difference is greater than a threshold, and to receive a first modified MTC reservation pattern from the pattern manager where the MTC-On interval is extended into the next MTC-Off interval.

2. The system of claim 1 wherein modification of the MTC reservation pattern includes: extending the MTC-On interval into the next MTC-Off interval until the random access procedures for each of the MTC devices are complete.

3. The system of claim 1 wherein modification of the MTC reservation pattern includes: truncating the next MTC-Off interval, and reallocating, a truncated portion of the next MTC-Off interval as another MTC-On interval.

4. The system of claim 1 wherein the at least one memory and the executable instructions are configured to, with the at least one processor, cause the access network element to send a second message to the pattern manager requesting truncation of the next MTC-Off interval when the time difference is less than the threshold, and receive a second modified MTC reservation pattern from the pattern manager where a truncated portion of the next MTC-Off interval is reallocated as another MTC-On interval.

5. The system of claim 1 wherein the at least one memory and the executable instructions are configured to, with the at least one processor, cause the access network element to, during an MTC-Off interval of the MTC reservation pattern, receive preambles for random access procedures from the MTC devices, and to postpone the random access procedures for the MTC devices.

6. The system of claim 5 the at least one memory and the executable instructions are configured to, with the at least one processor, cause the access network element to determine a time difference between receipt of a preamble for a random access procedure and the transition from the MTC-Off interval to a next MTC-On interval, send a message to the pattern manager requesting truncation of the MTC-Off interval when the time difference is greater than a threshold, and to receive a modified MTC reservation pattern from the pattern manager where a truncated portion of the MTC-Off interval is reallocated as another MTC-On interval; and allow the MTC-Off interval to expire without modifying the MTC reservation pattern when the time difference is less than the threshold.

7. A method of handling random access procedures over an air interface of an access network, the method comprising:
 storing, in a pattern database, a Machine-Type Communications (MTC) reservation pattern that defines at least one MTC-On interval where MTC is allowed, and defines at least one MTC-Off interval where MTC is prohibited; and
 identifying the MTC reservation pattern from the pattern database;
 during an MTC-On interval of the MTC reservation pattern, the method comprises:
 receiving preambles for the random access procedures from MTC devices;
 performing the random access procedures for the MTC devices in response to the preambles;
 detecting a transition from the MTC-On interval to a next MTC-Off interval in the MTC reservation pattern;
 determining whether the random access procedures for the MTC devices will complete before the transition; and
 modifying the MTC reservation pattern responsive to a determination that the random access procedures for the MTC devices will not complete before the transition wherein modifying the MTC reservation pattern comprises:
 determining a time difference between receipt of a preamble for a random access procedure and the transition from the MTC-On interval to the next MTC-Off interval;
 sending a first message to a pattern manager requesting extension of the MTC-On interval when the time difference is greater than a threshold; and
 receiving a first modified MTC reservation pattern from the pattern manager where the MTC-On interval is extended into the next MTC-Off interval.

8. The method of claim 7 wherein modifying the MTC reservation pattern comprises: extending the MTC-On interval into the next MTC-Off interval until the random access procedures for each of the MTC devices are complete.

9. The method of claim 7 wherein modifying the MTC reservation pattern comprises: truncating the next MTC-Off interval; and reallocating a truncated portion of the next MTC-Off interval as another MTC-On interval.

10. The method of claim 7 further comprising: sending a second message to the pattern manager requesting truncation of the next MTC-Off interval when the time difference is less than the threshold; and receiving a second modified MTC reservation pattern from the pattern manager where a truncated portion of the next MTC-Off interval is reallocated as another MTC-On interval.

11. The method of claim 7 wherein: during an MTC-Off interval of the MTC reservation pattern, the method comprises: receiving preambles for random access procedures from the MTC devices; and postponing the random access procedures for the MTC devices.

12. The method of claim 11 further comprising: determining a time difference between receipt of a preamble for a random access procedure and the transition from the MTC-Off interval to a next MTC-On interval; when the time difference is greater than a threshold, sending a message to the pattern manager requesting truncation of the MTC-Off interval, and receiving a modified MTC reservation pattern from the pattern manager where a truncated portion of the MTC-Off interval is reallocated as another MTC-On interval; and when the time difference is less than the threshold, allowing the MTC-Off interval to expire without modifying the MTC reservation pattern.

13. A non-transitory computer readable medium comprising program instructions for causing an access network element of an access network that is configured to communicate with a plurality of devices over an air interface to perform at least the following:
 store a Machine-Type Communications (MTC) reservation pattern that defines at least one MTC-On interval where MTC is allowed, and defines at least one MTC-Off interval where MTC is prohibited;
 during an MTC-On interval of the MTC reservation pattern, receive preambles for random access procedures from MTC devices, and perform the random access procedures for the MTC devices in response to the preambles;
 detect a transition from the MTC-On interval to a next MTC-Off interval in the MTC reservation pattern, and determine whether the random access procedures for the MTC devices will complete before the transition;

responsive to a determination that the random access procedures for the MTC devices will not complete before the transition, initiate modification of the MTC reservation pattern; and determine a time difference between receipt of a preamble for a random access procedure and the transition from the MTC-On interval to the next MTC-Off interval, send a first message requesting extension of the MTC-On interval when the time difference is greater than a threshold, and receive a first modified MTC reservation pattern where the MTC-On interval is extended into the next MTC-Off interval.

14. The non-transitory computer readable medium of claim 13 wherein modification of the MTC reservation pattern includes: extending the MTC-On interval into the next MTC-Off interval until the random access procedures for each of the MTC devices are complete.

15. The non-transitory computer readable medium of claim 13 wherein modification of the MTC reservation pattern includes: truncating the next MTC-Off interval, and reallocating a truncated portion of the next MTC-Off interval as another MTC-On interval.

16. The non-transitory computer readable medium of claim 13 wherein the program instructions cause the access network element to: send a second message requesting truncation of the next MTC-Off interval when the time difference is greater than the threshold, and to receive a second modified MTC reservation pattern where a truncated portion of the next MTC-Off interval is reallocated as another MTC-On interval.

17. The non-transitory computer readable medium of claim 13 wherein the program instructions cause the access network element to: during an MTC-Off interval of the MTC reservation pattern, receive preambles for random access procedures from the MTC devices, and to postpone the random access procedures for the MTC devices.

18. The non-transitory computer readable medium of claim 17 wherein the program instruction cause the access network element to: determine a time difference between receipt of a preamble for a random access procedure and the transition from the MTC-Off interval to a next MTC-On interval, send a message requesting truncation of the MTC-Off interval when the time difference is greater than a threshold, and receive a modified MTC reservation pattern where a truncated portion of the MTC-Off interval is reallocated as another MTC-On interval; and allow the MTC-Off interval to expire without modifying the MTC reservation pattern when the time difference is less than the threshold.

* * * * *